(12) United States Patent
Jiang et al.

(10) Patent No.: US 10,608,714 B2
(45) Date of Patent: Mar. 31, 2020

(54) METHOD FOR INDICATING PRECODING VECTOR, AND DEVICE

(71) Applicant: HUAWEI TECHNOLOGIES CO., LTD., Shenzhen, Guangdong (CN)

(72) Inventors: Peng Jiang, Shanghai (CN); Huangping Jin, Shanghai (CN); Wei Han, Shanghai (CN); Peng Shang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/576,594

(22) Filed: Sep. 19, 2019

(65) Prior Publication Data

US 2020/0014435 A1      Jan. 9, 2020

Related U.S. Application Data

(63) Continuation of application No. 16/205,336, filed on Nov. 30, 2018, now Pat. No. 10,447,357, which is a (Continued)

(30) Foreign Application Priority Data

Apr. 26, 2017   (CN) .......................... 2017 1 0284175

(51) Int. Cl.
  *H04B 7/0456*   (2017.01)
(52) U.S. Cl.
  CPC ................................. *H04B 7/0456* (2013.01)

(58) Field of Classification Search
  CPC .......... H03M 7/00; H03M 7/30; H03M 13/00; H04B 7/00; H04B 7/02; H04B 7/04;
  (Continued)

(56) References Cited

U.S. PATENT DOCUMENTS

| | | | |
|---|---|---|---|
| 9,088,323 | B2 | 7/2015 | Park et al. |
| 9,319,121 | B2 | 4/2016 | Onggosanusi et al. |

(Continued)

FOREIGN PATENT DOCUMENTS

| | | |
|---|---|---|
| CN | 101283407 A | 10/2008 |
| CN | 101938301 A | 1/2011 |

(Continued)

OTHER PUBLICATIONS

European Search Opinion issued in European Application No. 18790224.2 dated Apr. 11, 2019, 4 pages.

(Continued)

*Primary Examiner* — Shawkat M Ali
(74) *Attorney, Agent, or Firm* — Fish & Richardson P.C.

(57) ABSTRACT

This application disclose a method for indicating and determining a precoding vector related to precoding technologies to increase an overall system performance gain. The method may include: generating indication information, and sending the indication information. The indication information is used to indicate a plurality of component vectors of a precoding vector and a combination coefficient of each component vector. The combination coefficient of the component vector includes at least one of the following types: a wideband amplitude coefficient, a narrowband amplitude coefficient, and a narrowband phase coefficient.

19 Claims, 7 Drawing Sheets

Related U.S. Application Data continuation of application No. PCT/CN2018/082887, filed on Apr. 12, 2018.

(58) Field of Classification Search
CPC .......... H04B 7/06; H04B 7/10; H04B 7/0456; H04B 17/00; H04L 5/00; H04L 25/00; H04L 25/49; H04L 27/00; H04L 27/28; H04W 4/00; H04W 24/10; H04W 48/08; H04W 72/00; H04W 72/04; H04W 72/12
USPC ........ 370/203, 252, 310, 312, 328; 375/219, 375/260, 267, 295, 316, 340; 455/63.1, 455/67.11; 714/701, 752, 758
See application file for complete search history.

(56) References Cited

U.S. PATENT DOCUMENTS

| | | | |
|---|---|---|---|
| 10,200,103 | B2 | 2/2019 | Rahman et al. |
| 2005/0287978 | A1 | 12/2005 | Maltsev et al. |
| 2009/0060082 | A1 | 3/2009 | Yuda et al. |
| 2009/0281811 | A1 | 11/2009 | Oshikiri et al. |
| 2011/0080901 | A1 | 4/2011 | Lin et al. |
| 2011/0194593 | A1 | 8/2011 | Geirhofer et al. |
| 2012/0177092 | A1 | 7/2012 | Zirwas |
| 2013/0022146 | A1 | 1/2013 | Chen |
| 2013/0077709 | A1 | 3/2013 | Zhou |
| 2013/0121437 | A1 | 5/2013 | Wang et al. |
| 2013/0201912 | A1 | 8/2013 | Sheng et al. |
| 2014/0328422 | A1 | 11/2014 | Chen et al. |
| 2015/0030092 | A1 | 1/2015 | Krishnamurthy |
| 2016/0072562 | A1 | 3/2016 | Onggosanusi et al. |
| 2016/0119097 | A1 | 4/2016 | Nam et al. |
| 2016/0142117 | A1 | 5/2016 | Rahman et al. |
| 2016/0156397 | A1* | 6/2016 | Onggosanusi ....... H04B 7/0456 |
| 2016/0218791 | A1* | 7/2016 | Ko ................. H04B 7/0486 |
| 2016/0226647 | A1 | 8/2016 | Wang et al. |
| 2017/0288751 | A1* | 10/2017 | Faxer ............. H04B 7/0408 |
| 2018/0083683 | A1 | 3/2018 | Kim et al. |
| 2018/0145737 | A1 | 5/2018 | Rahman et al. |
| 2018/0278315 | A1 | 9/2018 | Wu et al. |
| 2018/0302140 | A1 | 10/2018 | Rahman et al. |

FOREIGN PATENT DOCUMENTS

| | | |
|---|---|---|
| CN | 102484870 A | 5/2012 |
| CN | 104104389 A | 10/2014 |
| CN | 105406911 | 3/2016 |
| CN | 105723627 A | 6/2016 |
| JP | 2008504735 A | 2/2008 |
| JP | 2013511167 A | 3/2013 |
| WO | 2006118123 A1 | 11/2006 |

OTHER PUBLICATIONS

European Search Report issued in European Application No. 18790224 dated Apr. 11, 2019, 1 pages.
Extended European Search Report issued in European Application No. 18790224.2 dated Apr. 11, 2019, 1 page.
International Search Report and Written Opinion issued in International Application No. PCT/CN2018/082887 dated Jul. 2, 2018, 12 pages.
R1-1611675 Huawei, HiSilicon,"Design for Type I Feedback",3GPP TSG RAN WG1 Meeting #87,Reno, USA, Nov. 14-18, 2016,total 7 pages.
R1-1612351 Ericsson,"Type II CSI Feedback",3GPP TSG-RAN WG1#87, Reno, USA Nov. 14-18, 2016, total 10 pages.
R1-1700414 Huawei, HiSilicon,""Design for Type I Feedback"",3GPP TSG RAN WG1 NR Ad Hoc Meeting.Spokane, USA, Jan. 16-20, 2017, total 8 pages.
R1-1703343 Huawei, HiSilicon,""Design for Type I Feedback"",3GPP TSG RAN WG1 Meeting #88,Athens, Greece, Feb. 13-17, 2017,total 6 pages.
R1-1705076 Huawei, HiSilicon,""Design for Type II Feedback"",3GPP TSG RAN WG1 Meeting #88bis,Spokane, USA,Apr. 3-7, 2017,total 11 pages.
Samsung:""Type II CSI reporting"", 3GPP Draft; R1-1705349, vol. RAN WG1, No. Spokane, Apr. 2, 2017, KP051243479, 11 pages.
Senlin Feng,"On Precoding for MU-MIMO Systems", Xidian University, dated Mar. 5, 2018, total 65 pages.
Kakishima et al, "System-Level Evaluation on Enhanced 4-Tx Codebook for LTE-Advanced Downlink Multi-User MIMO," IEICE Technical Report, vol. 113, No. 385, Jan. 16, 2014, 22 pages (with English translation).
Office Action issued in Japanese Application No. 2018-568328 dated Nov. 25, 2019, 5 pages (with English translation).

* cited by examiner

METHOD FOR INDICATING PRECODING VECTOR, AND DEVICE

CROSS-REFERENCE TO RELATED APPLICATIONS

This application is a continuation of U.S. patent application Ser. No. 16/205,336, filed on Nov. 30, 2018, which is a continuation of International Application No. PCT/CN2018/082887, filed on Apr. 12, 2018. The International Application claims priority to Chinese Patent Application No. 201710284175.3, filed on Apr. 26, 2017. All of the aforementioned patent applications are hereby incorporated by reference in their entireties.

TECHNICAL FIELD

This application relates to precoding technologies, and in particular, to a method for indicating and determining a precoding vector, and a device.

BACKGROUND

Multiple-input multiple-output (MIMO) technology brings a revolutionary change to wireless communications. With deployment of a plurality of antennas on a transmit-end device and a receive-end device, the MIMO technology can significantly improve performance of a wireless communications system. For example, in a diversity scenario, the MIMO technology can improve transmission reliability effectively, and in a multiplexing scenario, the MIMO technology can increase a transmission throughput greatly.

A MIMO system usually uses a precoding technology to improve a channel, so as to improve an effect of spatial multiplexing. Specifically, in the precoding technology, a precoding matrix that matches a channel is used to process a data stream for spatial multiplexing (spatial stream for short), so as to precode the channel and improve reception quality of the spatial stream.

Each spatial stream that participates in spatial multiplexing corresponds to one column vector of a precoding matrix. In the precoding process, the transmit-end device uses the column vector to precode the spatial stream. Therefore, the column vector may also be referred to as a precoding vector. The precoding vector may be determined by the receive-end device based on a basic codebook, and fed back to the transmit-end device. The basic codebook is a set of candidate vectors, and a weighted sum of a plurality of candidate vectors that match a channel the most can be used as the precoding vector. Generally, there may be a plurality of spatial streams that participate in spatial multiplexing, and precoding vectors of these spatial streams correspond to column vectors of the precoding matrix. Related content of the spatial stream, the precoding vector, and the precoding matrix can be found in the prior art, and therefore details are not described in this specification.

In a scenario in which a weighted sum of a plurality of component vectors that match a channel the most is used as a precoding vector, quantity of quantization bit of a weight (i.e., combination coefficient) of one component vector is equal to that of any other component vector. This causes improper overheads when feeding back indication information that indicates a combination coefficient, and therefore makes an overall system performance gain unsatisfactory.

SUMMARY

This application provides a method for indicating and determining a precoding vector, and a device, to help achieve the following beneficial effects: a certain degree of precision of a precoding vector is ensured, and overheads for feeding back indication information indicating a combination coefficient are properly set, thereby increasing an overall system performance gain.

According to a first aspect, this application provides an indication method and a receive-end device.

In a possible design, this application provides an indication method. An entity for executing the method may include but is not limited to a receive-end device. The method may include: generating indication information, and sending the indication information. The indication information is used to indicate a plurality of component vectors and a combination coefficient of each component vector, the combination coefficient of the component vector includes at least one of the following types: a wideband amplitude coefficient, a narrowband amplitude coefficient, and a narrowband phase coefficient, and quantization bit quantities of same-type combination coefficients of at least two component vectors in the plurality of component vectors except a normalization reference component vector are different. The plurality of component vectors may be some or all component vectors used by a transmit end to determine a precoding vector. Based on the technical solution, the receive-end device may set, to a relatively large value, a quantization bit quantity of a combination coefficient of a component vector having relatively great impact on the precoding vector, and set, to a relatively small value, a quantization bit quantity of a combination coefficient of a component vector having relatively small impact on the precoding vector, so as to help achieve the following beneficial effects: A certain degree of precision of the precoding vector is ensured, and overheads for feeding back indication information indicating a combination coefficient are properly set, thereby increasing an overall system performance gain.

Correspondingly, this application further provides a receive-end device. The receive-end device may implement the indication method described in the first aspect. For example, the receive-end device may be but is not limited to a terminal device, and the receive-end device may implement the method by using software or hardware or by executing corresponding software by hardware.

In a possible design, the receive-end device may include a processor and a memory. The processor is configured to support the receive-end device in performing corresponding functions in the method in the first aspect. The memory is configured to be coupled to the processor, and the memory stores a program (instruction) and data that are necessary for the receive-end device. In addition, the receive-end device may further include a communications interface, configured to support communication between the receive-end device and another network element. The communications interface may be a transceiver.

In another possible design, the receive-end device may include a generation unit and a sending unit. The generation unit is configured to generate indication information. The sending unit is configured to send the indication information. The indication information is used to indicate a plurality of component vectors and a combination coefficient of each component vector, the combination coefficient of the component vector includes at least one of the following types: a wideband amplitude coefficient, a narrowband amplitude coefficient, and a narrowband phase coefficient, and quantization bit quantities of same-type combination coefficients of at least two component vectors in the plurality of component vectors except a normalization reference component vector are different.

According to a second aspect, this application provides a method for determining a precoding vector and a transmit-end device.

In a possible design, this application provides a method for determining a precoding vector. An entity for executing the method may include but is not limited to a transmit-end device. The method may include: receiving indication information, and determining a precoding vector based on the indication information. The indication information is used to indicate a plurality of component vectors and a combination coefficient of each component vector, the combination coefficient of the component vector includes at least one of the following types: a wideband amplitude coefficient, a narrowband amplitude coefficient, and a narrowband phase coefficient, and quantization bit quantities of same-type combination coefficients of at least two component vectors in the plurality of component vectors except a normalization reference component vector are different. For beneficial effects of this technical solution, refer to the method provided in the first aspect.

Correspondingly, this application further provides a transmit-end device. The transmit-end device can implement the method for determining a precoding vector in the second aspect. For example, the transmit-end device may include but is not limited to a base station, and the transmit-end device may implement the method by using software or hardware or by executing corresponding software by hardware.

In a possible design, the transmit-end device may include a processor and a memory. The processor is configured to support the transmit-end device in performing corresponding functions in the method in the second aspect. The memory is configured to be coupled to the processor, and the memory stores a program (instruction) and data that are necessary for the transmit-end device. In addition, the transmit-end device may further include a communications interface, configured to support communication between the transmit-end device and another network element. The communications interface may be a transceiver.

In another possible design, the transmit-end device may include a receiving unit and a determining unit. The receiving unit is configured to receive indication information. The determining unit is configured to determine a precoding vector based on the indication information. The indication information is used to indicate a plurality of component vectors and a combination coefficient of each component vector, the combination coefficient of the component vector includes at least one of the following types: a wideband amplitude coefficient, a narrowband amplitude coefficient, and a narrowband phase coefficient, and quantization bit quantities of same-type combination coefficients of at least two component vectors in the plurality of component vectors except a normalization reference component vector are different.

Based on any one of the technical solutions provided above, in a possible design, the indication information may further be used to indicate at least one type of the following information: quantization bit quantities of wideband amplitude coefficients of the plurality of component vectors, quantization bit quantities of narrowband amplitude coefficients of the plurality of component vectors, and quantization bit quantities of narrowband phase coefficients of the plurality of component vectors. In this possible design, the indication information is used to indicate combination coefficients of some or all of the plurality of component vectors, so that combination coefficients of one or more component vectors can be adjusted with reference to actual channel quality, thereby helping increase an overall system performance gain. Certainly, an actual practice is not limited thereto. For example, the receive-end device and the transmit-end device may pre-agree on quantization bit quantities of combination coefficients of some or all component vectors based on a standard. In addition, a signaling indication manner and a standard-based pre-agreement manner may also be used in combination, and this is not limited in this application.

Based on any one of the technical solutions provided above, in a possible design, the quantization bit quantities of the narrowband amplitude coefficients of the plurality of component vectors include a first value and a second value. The indication information includes at least one piece of the following information: a quantity of first values and a quantity of second values. The first value is different from the second value. This possible design provides a technical solution of feeding back a quantization bit quantity of a narrowband amplitude coefficient.

Based on any one of the technical solutions provided above, in a possible design, the quantization bit quantities of the narrowband phase coefficients of the plurality of component vectors include a third value and a fourth value. The indication information includes at least one piece of the following information: a quantity of third values and a quantity of fourth values. The third value is different from the fourth value. This possible design provides a technical solution of feeding back a quantization bit quantity of a narrowband phase coefficient.

Based on any one of the technical solutions provided above, in a possible design, the quantization bit quantities of the wideband amplitude coefficients of the plurality of component vectors include a fifth value and a sixth value. The indication information includes at least one piece of the following information: a quantity of fifth values and a quantity of sixth values.

Based on any one of the technical solutions provided above, in a possible design, a quantity of the component vectors may be 4, 6, 8, or the like. When there are four component vectors, the four component vectors may include a first component vector, a second component vector, a third component vector, and a fourth component vector. A quantization bit quantity of a wideband amplitude coefficient of the first component vector is 0, a quantization bit quantity of a narrowband amplitude coefficient of the first component vector is 0, and a quantization bit quantity of a narrowband phase coefficient of the first component vector is 0. A quantization bit quantity of a wideband amplitude coefficient of the second component vector is 2, a quantization bit quantity of a narrowband amplitude coefficient of the second component vector is 1, and a quantization bit quantity of a narrowband phase coefficient of the second component vector is 2. A quantization bit quantity of a wideband amplitude coefficient of the third component vector is 2, a quantization bit quantity of a narrowband amplitude coefficient of the third component vector is 0, and a quantization bit quantity of a narrowband phase coefficient of the third component vector is 2. A quantization bit quantity of a wideband amplitude coefficient of the fourth component vector is 2, a quantization bit quantity of a narrowband amplitude coefficient of the fourth component vector is 0, and a quantization bit quantity of a narrowband phase coefficient of the fourth component vector is 2. Details may be shown by an example in which p=2 and K=1 in Table 7. Other examples are not listed one by one.

Based on any one of the technical solutions provided above, in a possible design, a set of possible values of a quantized value of a wideband amplitude coefficient may be: −gap/2, −gap/2−gap, ..., −gap/2−($2^b$−1)gap. Optionally, the gap is equal to 1.6 dB, 3 dB, or the like.

Based on any one of the technical solutions provided above, in a possible design, if a wideband amplitude coefficient of a component vector is greater than a narrowband amplitude coefficient, a quantized value of the narrowband amplitude coefficient may be a constant, for example, 1.2 dB. In this case, an index of the quantized value of the narrowband amplitude coefficient may be 1. If a wideband amplitude coefficient of a component vector is less than a narrowband amplitude coefficient, a quantized value of the narrowband amplitude coefficient may be another constant, for example, −1.2 dB. In this case, an index of the quantized value of the narrowband amplitude coefficient may be 0.

This application further provides a computer storage medium. The computer storage medium stores a computer program instruction, and when the program instruction runs on a computer, the computer is enabled to execute the method in any one of the foregoing aspects.

This application further provides a computer program product. When the computer program product runs on a computer, the computer is enabled to execute the method in any one of the foregoing aspects.

It may be understood that any apparatus, computer storage medium, or computer program product provided above is configured to execute a corresponding method provided above. Therefore, for beneficial effects that can be achieved by the any apparatus, computer storage medium, or computer program product, refer to beneficial effects of corresponding solutions in the following implementations, and details are not described herein.

DESCRIPTION OF EMBODIMENTS

Figure 1:
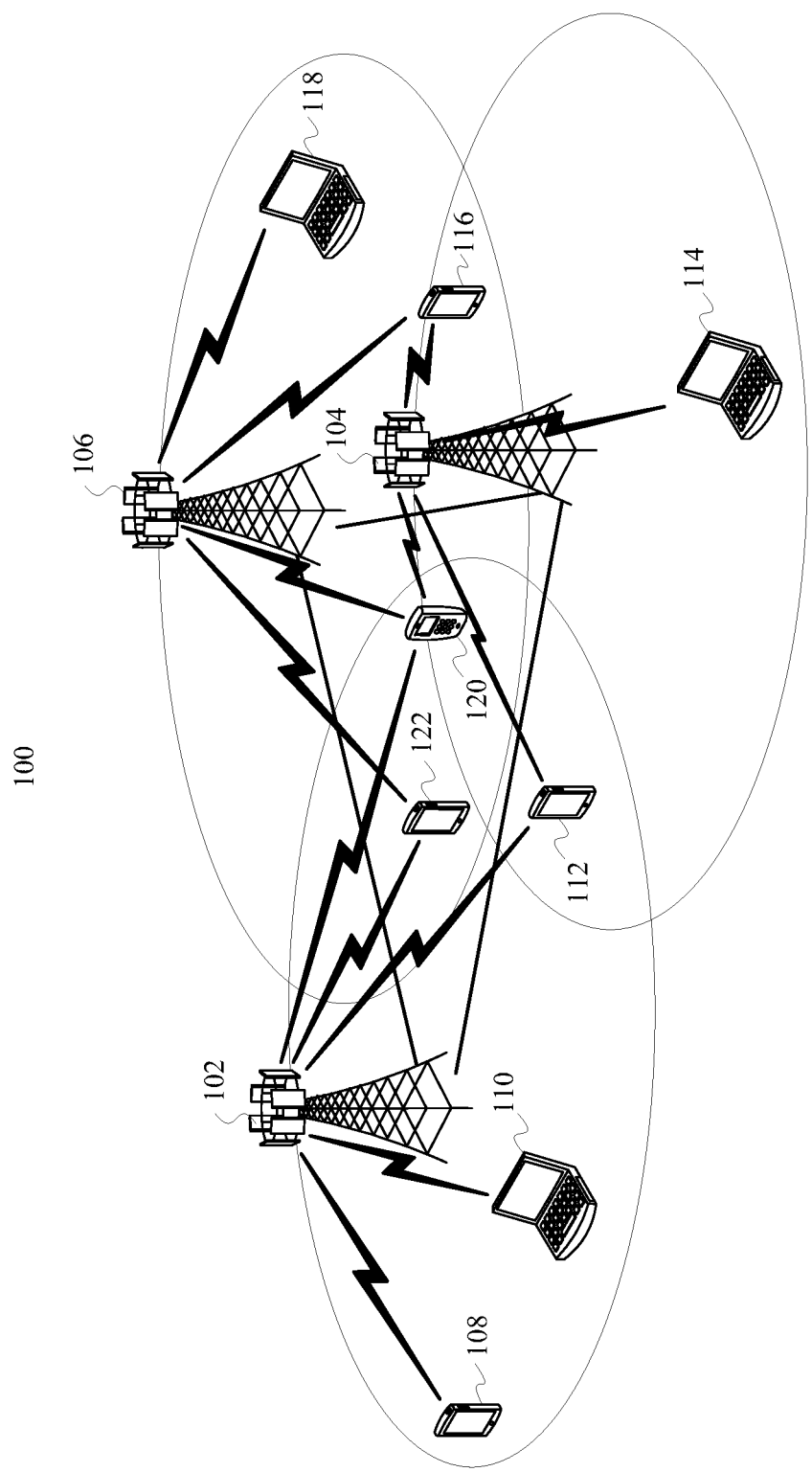
FIG. 1 is a schematic diagram of an example of a wireless communications network according to an embodiment of this application.

First, related technologies and terms in this specification are explained, to facilitate readers' understanding.

Generally, in a communication process, a receive-end device determines a channel matrix based on a reference signal transmitted by a transmit-end device, determines a precoding vector based on the channel matrix and a basic codebook, and feeds back related information of the obtained precoding vector to the transmit-end device; and the transmit-end device obtains the precoding vector, precodes to-be-transmitted data based on the precoding vector, and transmits precoded data to the receive-end device.

(1) Ideal Precoding Vector, Component Vector, and Basic Codebook

In practice, an ideal precoding vector may be obtained by using a plurality of methods, and ideal precoding vectors obtained by using different methods may be different. For example, an ideal precoding vector may be obtained by performing singular value decomposition (SVD) on a channel matrix. Specifically, through singular value decomposition on the channel matrix, the channel matrix may be decomposed into a product of a left unitary matrix, a diagonal matrix, and a right unitary matrix. In practice, a conjugate transpose matrix of the right unitary matrix may be used as an ideal precoding matrix, and a column vector of the ideal precoding matrix may be used as the ideal precoding vector. In addition, the ideal precoding matrix obtained through singular value decomposition may also be obtained through, for example, but not limited to, eigenvalue decomposition on a related matrix of the channel matrix. In practice, a specific value of the ideal precoding vector and an obtaining method of the specific value may be determined depending on an overall system design requirement. Technical details about the ideal precoding vector have been clearly described in the prior art, and therefore are not described herein.

After the ideal precoding vector is obtained, the ideal precoding vector may be approximately expressed as a weighted sum of a plurality of component vectors:

$$P \approx \sum_{i=1}^{m} a_i b_i,$$

where

P represents the ideal precoding vector; $b_i$ represents a component vector i; $a_i$ represents a combination coefficient of the component vector i; and in practice, a quantity m (m is a positive integer) of component vectors may be set depending on a specific requirement (for example, but not limited to, a precision requirement), for example, the quantity of component vectors may be a preset quantity.

A basic codebook is a set of candidate vectors. The component vectors are selected from the basic codebook. The basic codebook may be usually expressed as a matrix. Therefore, the basic codebook may also be referred to as a basic codebook matrix, and the candidate vectors are column vectors of the basic codebook matrix. Unless otherwise noted, or if the basic codebook mentioned in this specification does not contradict an actual function or inherent logic of the basic codebook in related descriptions, the basic codebook can be interchanged with the basic codebook matrix.

The basic codebook matrix includes a plurality of column vectors, and some of the column vectors may be selected as the component vectors. There are a plurality of component vector selection methods, and a proper method may be selected depending on a specific requirement. For example, a component vector may be determined from the plurality of column vectors based on similarity of a column vector of the basic codebook matrix to the ideal precoding vector. A plurality of column vectors that are most similar to the ideal precoding vector may be chosen as the component vectors. In practice, the similarity may be specifically expressed as, for example, but not limited to, an inner product of or a Euclidean distance between a column vector of the basic codebook matrix and the ideal precoding vector. Using an inner product as an example, when determining component vector, a plurality of column vectors may be used as component vectors, where inner products (for example, if an inner product is a complex number, an amplitude of the inner product is used) of the plurality of column vectors and the ideal precoding vector are the largest; and when there are a plurality of basic codebook matrices, the plurality of column vectors may belong to different basic codebooks. In addition, an inner product of each component vector and the ideal precoding vector may further be used as a combination coefficient of the component vector.

(2) Wideband and Narrowband

The wideband may be a system bandwidth, for example, 20 M (mega), or may be a part of a system bandwidth. The wideband may be divided into a plurality of narrowbands, and the narrowband may be understood as a bandwidth allocated to a terminal device. A quantity of narrowbands into which the wideband is divided is not limited in this application. Definitions of the wideband and the narrowband are not limited to the foregoing descriptions, and in practice, reference may be made to the prior art.

In this application, an ideal precoding vector obtained based on a wideband channel is referred to as a "first ideal precoding vector", and an ideal precoding vector obtained based on a narrowband channel is referred to as a "second ideal precoding vector".

(3) Wideband Amplitude Coefficient, Narrowband Amplitude Coefficient, and Narrowband Phase Coefficient The second ideal precoding vector may be expressed in the following form:

$$W = W_1 \times W_2, \text{ where}$$

$W_1$ is information about a long-term wideband, $W_2$ is information about a short-term narrowband, $W_1$ includes a component vector and a wideband combination coefficient, $W_2$ includes a narrowband combination coefficient, the wideband combination coefficient may include a wideband amplitude coefficient, and the narrowband combination coefficient may include a narrowband amplitude coefficient and a narrowband phase coefficient.

Using an inner product as an example, if an inner product of a component vector and the first ideal precoding vector is expressed as a complex number: $a+bj$, a wideband amplitude coefficient of the component vector may be expressed as: $\sqrt{a^2+b^2}$. If an inner product of a component vector (or a vector obtained from a product of a component vector and a wideband amplitude coefficient of the component vector) and the second ideal precoding vector is expressed as a complex number: $c+dj$, a narrowband amplitude coefficient of the component vector may be expressed as: $\sqrt{c^2+d^2}$ and a narrowband phase coefficient may be expressed as: $\arctan(d/c)$. It may be understood that the wideband amplitude coefficient, the narrowband amplitude coefficient, and the narrowband phase coefficient may further be obtained in another manner in the prior art, and this is not limited in this application.

Wideband amplitude coefficients of different component vectors may be the same, or may be different. The wideband amplitude coefficients of the component vectors may or may not be quantized. If the wideband amplitude coefficients of the component vectors are quantized, quantization bit quantities of the wideband amplitude coefficients of the different component vectors may be the same, or may be different. Narrowband amplitude coefficients of the different component vectors may be the same, or may be different. The narrowband amplitude coefficients of the component vectors may or may not be quantized. If the narrowband amplitude coefficients of the component vectors are quantized, quantization bit quantities of the wideband amplitude coefficients of the different component vectors may be the same, or may be different. Narrowband phase coefficients of the different component vectors may be the same, or may be different. The narrowband phase coefficients of the component vectors may or may not be quantized. If the narrowband phase coefficients of the component vectors are quantized, quantization bit quantities of the wideband amplitude coefficients of the different component vectors may be the same, or may be different.

In an example, the second ideal precoding vector may be expressed in the following form:

$$W = W_1 W_2 = \begin{bmatrix} p_1 b_1, p_2 b_2 \ldots p_L b_L & 0 \\ 0 & p_{L+1} b_1, p_{L+2} b_2 \ldots p_{2L} b_L \end{bmatrix} \begin{bmatrix} 1 \\ c_1 \\ c_2 \\ c_3 \\ c_4 \\ \ldots \\ \ldots \\ c_{2L-1} \end{bmatrix},$$

where $$\begin{bmatrix} 1 \\ c_1 \\ c_2 \\ c_3 \\ c_4 \\ \ldots \\ \ldots \\ c_{2L-1} \end{bmatrix}$$

may be obtained by using $$\begin{bmatrix} 1 \\ \alpha_1 \\ \alpha_2 \\ \alpha_3 \\ \alpha_4 \\ \ldots \\ \ldots \\ \alpha_{2L-1} \end{bmatrix}$$

and $$\begin{bmatrix} 1 \\ \theta_1 \\ \theta_2 \\ \theta_3 \\ \theta_4 \\ \ldots \\ \ldots \\ \theta_{2L-1} \end{bmatrix}.$$

Each parameter from $b_1$ to $b_L$ represents a component vector, and each parameter from $p_1$ to $p_{2L}$ represents a wideband amplitude coefficient of a component vector. Each parameter from $\alpha_1$ to $\alpha_{2L-1}$ represents a narrowband amplitude coefficient of a component vector, and each parameter from $\theta_1$ to $\theta_{2L-1}$ represents a narrowband phase coefficient of a component vector. L represents a total quantity of component vectors in a single polarization direction. One component vector may correspond to one beam direction. In this application, descriptions are provided by using an example in which a beam direction includes a dual polarization direction, and an actual practice is not limited thereto.

(4) Quantization Bit Quantity

Any combination coefficient (for example, $p_1$ to $p_{2L}$, $\alpha_1$ to $\alpha_{2L-1}$, or $\theta 1$ to $\theta_{2L-1}$) may or may not be a quantized value. When a combination coefficient that is a quantized value, a quantity of possible values of the quantized value is determined based on a quantization bit quantity allocated to the combination coefficient by the receive-end device. If a quantization bit quantity allocated to a combination coefficient by the receive-end device is M, a quantity of possible values of the quantized value is $2^M$, where M is an integer greater than or equal to 0. An actual value of the quantized value is related to an actual channel, and may be specifically a value that is in the possible values of the quantized value and that is closest to a real value.

The following describes a quantized value of a combination coefficient by using a specific example:

If a quantization bit quantity of $p_0$ is 3 bits, $p_0$ has eight (that is, $2^3$) possible values. A set that includes the possible values of $p_0$ may be {−1.5, −4.5, −7.5, −10.5, −13.5 −16.5, −19.5, −22.5}. Each element in the set is a possible value of a wideband amplitude power and may be in a unit of decibel (dB). Based on this, if a wideband amplitude coefficient, of $b_0$, calculated by the receive-end device based on a wideband channel is −10 dB, an actual value of $p_0$ may be −10.5 dB.

If a quantity of quantization bit of $p_0$ is 2 bits, $p_0$ has four (that is, $2^2$) possible values. A set that includes the possible values of $p_0$ may be {−1.5, −7.5, −13.5, −19.5}. Each element in the set is a possible value of a wideband amplitude power and may be in a unit of dB. Based on this, if a wideband amplitude coefficient, of $b_0$, calculated by the receive-end device based on a wideband channel is −10 dB, an actual value of $p_0$ is −7.5 dB.

Quantized values of other combination coefficients are similar thereto, and are not listed one by one in this application.

(5) Normalization Reference Component Vector

Normalization needs to be performed before quantization, and a component vector used as a normalization reference is a normalization reference component vector. A combination coefficient of the normalization reference component vector is 1, and a value range of a combination coefficient of another component vector is from 0 to 1. It may be understood that the value or the value range herein is a value or a value range in a decimal domain.

In this application, the receive-end device may not allocate a quantization bit quantity to the normalization reference component vector. To be specific, a quantization bit quantity of the reference component vector is 0.

(6) A Plurality of, and/or, First, and Second

The term "a plurality of" in this application refers to two or more than two. The term "and/or" in this application is only an association relationship describing associated objects, indicating that three relationships may exist. For example, A and/or B may indicate three cases: only A exists, both A and B exist, and only B exists. In addition, in this specification, the character "/" usually indicates that an "or" relationship exists between contextually associated objects. The terms "first" and "second" in this application are intended to distinguish between different objects, but do not limit an order of the different objects.

In the prior art, quantization bit quantities of same-type combination coefficients (for example, a wideband amplitude coefficient, a narrowband amplitude coefficient, or a narrowband phase coefficient) of all component vectors are equal. For example, a quantization bit quantity of each parameter from $p_1$ to $p_{2L}$ is 3 bits. For another example, a quantization bit quantity of each parameter from $\alpha_1$ to $\alpha_{2L-1}$ is 2 bits.

When a weighted sum of a plurality of component vectors is used as a precoding vector, impact (or contribution) of each component vector on (or to) an ideal precoding vector is different. A magnitude of impact of each component vector on the ideal precoding vector may be represented by a combination coefficient of the component vector. Therefore, a combination coefficient configuration method in the prior art causes the following problems: if a relatively small quantization bit quantity is set, precision of a precoding vector obtained by a transmit-end device is not high; or if a relatively large quantization bit quantity is set, a receive-end device has to use a relatively large quantity of bits to feed the indication information that indicates the combination coefficients back to a transmit-end device, which causes relatively high overheads. Therefore, regardless of whether a relatively large quantization bit quantity or a relatively small quantization bit quantity is set, an overall system performance gain is unsatisfactory.

Based on this, embodiments of this application provide a method for indicating a precoding vector, a method for determining a precoding vector, and a device, to help achieve the following beneficial effects: a certain degree of precision of a precoding vector obtained by a transmit-end device is ensured, and overheads for feeding back indication information indicating a combination coefficient are properly set, thereby increasing an overall system performance gain.

FIG. 1 is a schematic diagram of an example of a wireless communications network 100 according to an embodiment of this application. As shown in FIG. 1, the wireless communications network 100 includes base stations 102 to 106 and terminal devices 108 to 122. The base stations 102 to 106 may communicate with each other by using backhaul links (shown by straight lines between the base stations 102 to 106). The backhaul links may be wired backhaul links (for example, optical fibers or copper cables), or may be wireless backhaul links (for example, microwave). The terminal devices 108 to 122 may communicate with the corresponding base stations 102 to 106 by using wireless links (shown by zigzag lines between the base stations 102 to 106 and the terminal devices 108 to 122).

The base stations 102 to 106 are configured to provide wireless access services to the terminal devices 108 to 122. Specifically, each base station corresponds to a service coverage area (also referred to as a cell, shown by each elliptical area in FIG. 1), and a terminal device entering the area may communicate with the base station by using a wireless signal, so as to accept a wireless access service provided by the base station. Service coverage areas of base stations may overlap, and a terminal device within an overlapping area may receive wireless signals from a plurality of base stations. Therefore, these base stations may coordinate with each other to provide a service for the terminal device. For example, the plurality of base stations may use a coordinated multipoint (CoMP) technology to provide a service to the terminal device located in the overlapping area. For example, as shown in FIG. 1, service coverage areas of the base station 102 and the base station 104 overlap, and the terminal device 112 is located in the overlapping area; therefore, the terminal device 112 may receive wireless signals from the base station 102 and the base station 104, and the base station 102 and the base station 104 may coordinate with each other to provide a service to the terminal device 112. For another example, as shown in FIG. 1, service coverage areas of the base station 102, the base station 104, and the base station 106 share an overlapping area, and the terminal device 120 is located in the overlapping area; therefore, the terminal device 120 may receive wireless signals from the base stations 102, 104, and 106, and the base stations 102, 104, and 106 may coordinate with each other to provide a service for the terminal device 120.

Depending on a wireless communications technology used by a base station, the base station may also be referred to as a NodeB, an evolved NodeB (eNodeB), an access point (AP), or the like. In addition, depending on a size of a provided service coverage area, the base station may also be classified into a macro base station for providing a macro cell, a pico base station for providing a pico cell, a femto base station for providing a femto cell, or the like. With continuous evolution of wireless communications technologies, a future base station may also use another name.

The terminal devices 108 to 122 may be various wireless communications devices having a wireless communication function, for example, but not limited to, a mobile cellular phone, a cordless phone, a personal digital assistant (PDA), a smartphone, a notebook computer, a tablet computer, a wireless data card, a wireless modulator-demodulator (Modem), or a wearable device such as a smartwatch. With the rise of the Internet of Things (IoT) technology, more devices originally having no wireless communication function, for example, but not limited to, household appliances, means of transportation, tools and equipment, service devices, and service facilities, start to possess a wireless communication function through configuration of a wireless communications unit, so that the devices can access a wireless communications network and accept remote control. Such devices have the wireless communication function through configuration of the wireless communications unit, and therefore also fall within a category of wireless communications devices. In addition, the terminal devices 108 to 122 may also be referred to as mobile stations, mobile devices, mobile terminals, wireless terminals, handheld devices, clients, or the like.

A plurality of antennas may be configured on both the base stations 102 to 106 and the terminal devices 108 to 122, to support a MIMO technology. Further, the base stations 102 to 106 and the terminal devices 108 to 122 support both a single-user MIMO (SU-MIMO) technology and multi-user MIMO (MU-MIMO). MU-MIMO may be implemented based on a space division multiple access (SDMA) technology. With configuration of the plurality of antennas, the base stations 102 to 106 and the terminal devices 108 to 122 can further flexibly support a single-input single-output (SISO) technology, a single-input multiple-output (SIMO) technology, and a multiple-input single-output (MISO) technology, to implement various diversity (for example, but not limited to, transmit diversity and receive diversity) and multiplexing technologies. The diversity technologies may include, for example, but not limited to, a transmit diversity (TD) technology and a receive diversity (RD) technology. The multiplexing technology may be a spatial multiplexing technology. In addition, the foregoing technologies may further include a plurality of implementation solutions. For example, the transmit diversity technology may include diversity modes such as space-time transmit diversity (STTD), space-frequency transmit diversity (SFTD), time switched transmit diversity (TSTD), frequency switched transmit diversity (FSTD), orthogonal transmit diversity (OTD), and cyclic delay diversity (CDD), and diversity modes obtained through derivation, evolution, and combination of the foregoing diversity modes. For example, a current LTE standard uses transmit diversity modes such as space time block coding (STBC), space frequency block coding (SFBC), and CDD.

In addition, the base stations 102 to 106 and the terminal devices 108 to 122 may communicate with each other by using various wireless communications technologies, for example, but not limited to, a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an Orthogonal Frequency Division Multiple Access (OFDMA) technology, a Single Carrier Frequency Division Multiple Access (SC-FDMA) technology, a Space Division Multiple Access (SDMA) technology, and a technology evolved and derived from these technologies. As radio access technologies (RAT), the foregoing wireless communications technologies are accepted by numerous wireless communications standards, thereby building up various wireless communications systems (or networks) that are widely known by people today, including but not limited to, a Global System for Mobile Communications (GSM), CDMA2000, Wideband CDMA (WCDMA), WiFi defined by 802.11 family standards, Worldwide Interoperability for Microwave Access (WiMAX), Long Term Evolution (LTE), LTE-advanced (LTE-A), and evolved systems of these wireless communications systems. Unless otherwise noted, the technical solutions provided in the embodiments of this application may be applied to the foregoing wireless communications technologies and wireless communications systems. In addition, the terms "system" and "network" may be interchanged.

It should be noted that the wireless communications network 100 shown in FIG. 1 is merely used as an example, and is not intended to limit the technical solutions of this application. Persons skilled in the art should understand that, in practice, the wireless communications network 100 may further include another device, for example, but not limited to, a base station controller (BSC), and a quantity of base stations and a quantity of terminal devices may be configured depending on a specific requirement.

In this specification, the receive-end device may be the terminal devices 108 to 122 shown in FIG. 1, and the transmit-end device may be the base stations 102 to 106 shown in FIG. 1; or the receive-end device may be the base stations 102 to 106 shown in FIG. 1, and the transmit-end device may be the terminal devices 108 to 122 shown in FIG. 1. The embodiments of this application provide an indication method, a method for determining a precoding vector, and a corresponding receive-end device and transmit-end device. The following describes in detail the technical solutions provided in the embodiments of this application.

Figure 2:
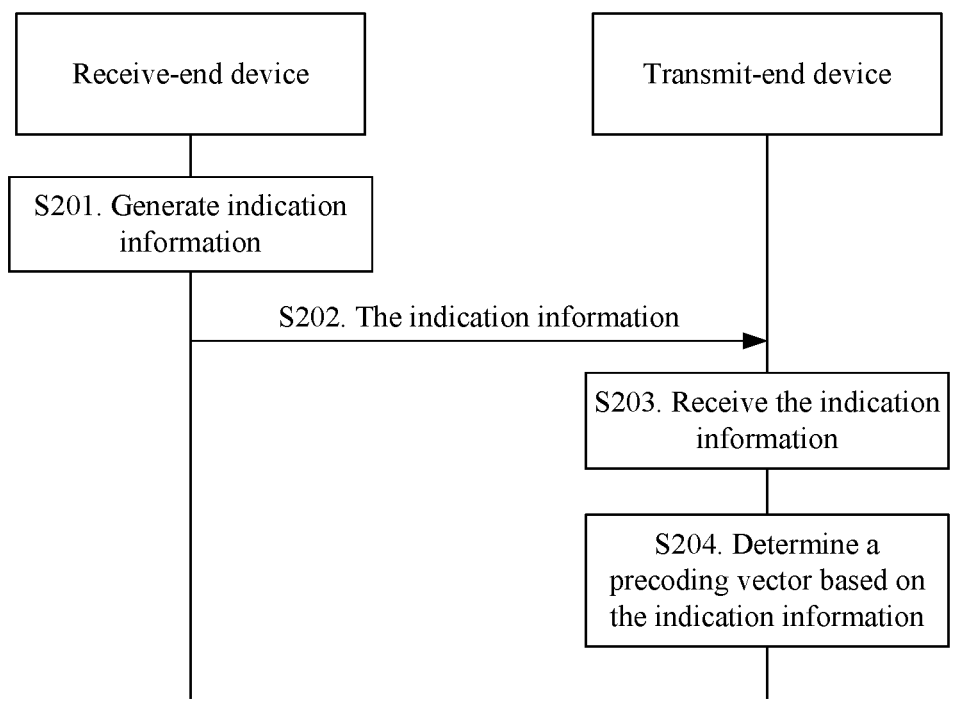
FIG. 2 is a schematic diagram of an indication method and a method for determining a precoding vector according to an embodiment of this application.

FIG. 2 is a schematic interactive diagram of an indication method and a method for determining a precoding vector according to an embodiment of this application. The method described in FIG. 2 may include the following steps S201 to S204.

S201. A receive-end device generates indication information, where the indication information is used to indicate a plurality of component vectors of an ideal precoding vector and a combination coefficient of each component vector, and combination coefficients of at least two component vectors in the plurality of component vectors except a normalization reference component vector have at least one of the following characteristics: quantization bit quantities of wideband amplitude coefficients are different, quantization bit quantities of narrowband amplitude coefficients are different, and quantization bit quantities of narrowband phase coefficients are different.

The ideal precoding vector may be the first ideal precoding vector described above, or may be the second ideal precoding vector described above. If the ideal precoding vector is the first ideal precoding vector, the combination coefficient may include a wideband amplitude coefficient, and does not include a narrowband amplitude coefficient and a narrowband phase coefficient. If the ideal precoding vector is the second ideal precoding vector, the combination coefficient may include a wideband amplitude coefficient, a narrowband amplitude coefficient, and a narrowband phase coefficient.

A specific manner of indicating a component vector is not limited in this application. For example, the indication information may include indexes of all of the plurality of component vectors, to indicate the plurality of component vectors; or may include indexes of some of the plurality of component vectors, a relationship between the some component vectors and remaining component vectors, and the like, to indicate the plurality of component vectors. A specific manner of indicating a combination coefficient of each component vector is not limited in this application. For example, the indication information may include indexes of combination coefficients of all of the plurality of component vectors, to indicate the combination coefficients of the plurality of component vectors; or may include indexes of combination coefficients of some of the plurality of component vectors, a relationship between the indexes of the combination coefficients of the some component vectors and indexes of combination coefficients of remaining component vectors, and the like, to indicate the combination coefficients of the plurality of component vectors.

S202. The receive-end device sends the indication information.

The indication information may be a precoding vector indicator (PMI), or may be other information. The indication information may be carried in one or more messages in the prior art and sent by the receive-end device to a transmit-end device, or may be carried in one or more messages newly designed in this application and sent by the receive-end device to a transmit-end device.

S203. A transmit-end device receives the indication information.

S204. The transmit-end device determines a precoding vector based on the indication information.

According to the method provided in this embodiment of this application, the receive-end device may set, to a relatively large value, a quantization bit quantity of a combination coefficient of a component vector having relatively great impact on the precoding vector, and set, to a relatively small value, a quantization bit quantity of a combination coefficient of a component vector having relatively small impact on the ideal precoding vector. In this way, precision of the combination coefficient of the component vector having relatively great impact on the ideal precoding vector can be improved, and overheads for feeding back the combination coefficient of the component vector having relatively small impact on the ideal precoding vector can be reduced. If the precoding vector determined by the transmit-end device is closer to the ideal precoding vector, precision of the obtained precoding vector is higher. Therefore, the technical solution provided in this application helps achieve the following beneficial effects: A certain degree of precision of the precoding vector obtained by the transmit-end device is ensured, and overheads for feeding back indication information indicating combination coefficient are properly set, thereby increasing an overall system performance gain.

In an embodiment of this application, the indication information may further be used to indicate at least one type of the following information: quantization bit quantities of wideband amplitude coefficients of the plurality of component vectors, quantization bit quantities of narrowband amplitude coefficients of the plurality of component vectors, and quantization bit quantities of narrowband phase coefficients of the plurality of component vectors. In this embodiment, a signaling manner is used to make the transmit-end device obtain a quantization bit quantity of a combination coefficient of a component vector. In actual practice, the receive-end device and the transmit-end device may also pre-agree on a quantization bit quantity of a combination coefficient. For example, the quantization bit quantity of the combination coefficient is set before leaving a factory, or the quantization bit quantity is semi-statically set, for example, set by using radio resource control (RRC) signaling or other notification signaling. This may be, for example, but not limited to, the following case: The transmit-end device generates RRC signaling or other notification signaling carrying the quantization bit quantity and sends the RRC signaling or the other notification signaling to the receive-end device, and the receive-end device receives the RRC signaling or the other notification signaling and determines the quantization bit quantity based on the RRC signaling or the other notification signaling. Optionally, the indication information may include information such as a quantization bit quantity of a combination coefficient or an index of a quantization bit quantity, to indicate the quantization bit quantity of the combination coefficient.

It should be noted that the indication information in this application may specifically include one or more pieces of information. Each piece of information may have at least one function. The function may include but is not limited to any one of the following items: any one or more component vectors, any one or more combination coefficients of any one or more component vectors, quantization bit quantities of any one or more combination coefficients of any one or more component vectors, and the like. If the indication information includes a plurality of pieces of information, the plurality of pieces of information may be sent together, or may not be sent together.

Optionally, the quantization bit quantities of the narrowband amplitude coefficients of the plurality of component vectors include a first value and a second value. The indication information includes at least one piece of the following information: a quantity of first values and a quantity of second values.

Optionally, the quantization bit quantities of the narrowband phase coefficients of the plurality of component vectors include a third value and a fourth value. The indication information includes at least one piece of the following information: a quantity of third values and a quantity of fourth values.

Optionally, the quantization bit quantities of the wideband amplitude coefficients of the plurality of component vectors include a fifth value and a sixth value. The indication information includes at least one piece of the following information: a quantity of fifth values and a quantity of sixth values.

It may be understood that, in the foregoing optional manners, if a quantization bit quantity of any combination coefficient other than a combination coefficient of the normalization reference component vector has S values, the receive-end device only needs to indicate a maximum quantity of S−1 values to the transmit-end device, where S may be an integer greater than or equal to 2. In addition, in the foregoing manners, a signaling manner is used to make the transmit-end device obtain a quantity of quantization bits quantity. In actual practice, the receive-end device and the transmit-end device may also pre-agree on a rule of a quantity of quantization bits. For example, the quantity of quantization bits is set before leaving the factory, or the quantity of quantization bits is semi-statically set, for example, set by using RRC signaling or other notification signaling. For a specific manner, refer to the foregoing manner of setting a quantization bit quantity by using RRC signaling.

In an embodiment of this application, the receive-end device and the transmit-end device may agree on a sorting order of the plurality of component vectors based on a semi-static configuration manner (for example, an RRC signaling manner or another notification signaling manner; for a specific manner, refer to the foregoing manner of setting a quantization bit quantity by using RRC signaling) or based on a standard. For example, the plurality of component vectors may be sorted in an order of impact of each component vector on the ideal precoding vector, and then the transmit-end device may determine, based on the order, the combination coefficient of each component vector after receiving the indication information. An actual practice of determining a magnitude of impact of a component vector on the ideal precoding vector may be, for example, but not limited to, performing by determining a value of a wideband amplitude coefficient of each component vector. For example, a higher wideband amplitude coefficient of a component vector leads to greater impact of the component vector on the ideal precoding vector.

For example, assuming that there are four component vectors, and the four component vectors are denoted as component vectors 0 to 3, a sequence obtained after the four component vectors are sorted in descending order based on impact of the four component vectors on the ideal precoding vector is: the component vector 1, the component vector 0, the component vector 2, and the component vector 3. It is assumed that a quantization bit quantity of a narrowband phase coefficient of a first component vector in the sequence obtained after sorting is 3, and quantization bit quantities of narrowband phase coefficients of subsequent three component vectors are 2. When indexes of quantized values of narrowband phase coefficients of the four component vectors sent by the receive-end device to the transmit-end device is a binary number "100010111", if the indication information indicates that one quantization bit quantity value is 3 (to be specific, there is one first value), the transmit-end device may determine, based on this, that indexes of the narrowband phase coefficients of the four component vectors are 100, 01, 01, and 11, respectively.

Then the transmit-end device may learn, based on the sequence obtained after the four component vectors are sorted, that an index of a narrowband phase coefficient of the component vector 1 is 100, an index of a narrowband phase coefficient of the component vector 0 is 01, an index of a narrowband phase coefficient of the component vector 2 is 01, and an index of a narrowband phase coefficient of the component vector 3 is 11. Finally, the transmit-end device may learn of the narrowband phase coefficients based on a correspondence between the indexes of the narrowband phase coefficients and the narrowband phase coefficients. Other examples are not listed one by one.

The following describes the quantization bit quantity of the combination coefficient provided in this embodiment of this application. Before this, the following several points are described first.

For ease of description, in this application, quantization bit quantities of three combination coefficients, in other words, a wideband amplitude coefficient, a narrowband amplitude coefficient, and a narrowband phase coefficient of each component vector are denoted as (X, Y, Z), where X represents a quantization bit quantity of the wideband amplitude coefficient, Y represents a quantization bit quantity of the narrowband amplitude coefficient, and Z represents a quantization bit quantity of the narrowband phase coefficient. It may be understood that (X, Y, Z) may be a matrix. Specially, when (X, Y, Z) represents a combination coefficient of a component vector, (X, Y, Z) may be a vector.

For ease of description, the following provides descriptions by using an example in which the receive-end device does not allocate quantization bits to a wideband amplitude coefficient, a narrowband amplitude coefficient, and a narrowband phase coefficient of a normalization reference component vector, to be specific, (X, Y, Z)=(0, 0, 0). However, persons skilled in the art should understand that any normalization reference component vector may not be set, and in this case, for each component vector, quantization bit quantities of the foregoing combination coefficients may be fed back. In addition, for ease of description, the component vectors are sorted in descending order based on impact of the component vectors on the ideal precoding vector in the following. For any component vector (including a normalization reference component vector and a non-normalization reference component vector), if a quantization bit quantity of a combination coefficient (including a wideband amplitude coefficient, a narrowband amplitude coefficient, or a narrowband phase coefficient) of the component vector is 0, the combination coefficient may be a preset constant, where the preset constant may include but is not limited to 1. For example, if a quantization bit quantity of a wideband amplitude coefficient of a component vector is 0, the wideband amplitude coefficient of the component vector may be a preset constant, for example, 1.

For ease of description, in the following descriptions, quantization bit quantities of narrowband amplitude coefficients of a plurality of non-normalization reference component vectors include one or two values, and may be specifically 1 and/or 0; and quantization bit quantities of narrowband phase coefficients of the plurality of non-normalization reference component vectors include one or two values, and may be specifically 3 and/or 2. In actual practice, a quantity of possible values of a quantization bit quantity of a narrowband amplitude coefficient, a quantity of possible values of a quantization bit quantity of a narrowband phase coefficient, and the possible values are not limited in this application, and may be adjusted depending on an actual case.

It should be noted that impact of a change of a quantization bit quantity of a wideband amplitude coefficient on a quantity of bits occupied by the indication information is smaller than impact of a change of a quantization bit quantity of a narrowband amplitude/phase coefficient on the quantity of bits occupied by the indication information. For example, it is assumed that there are N component vectors, N is greater than or equal to 2, and a wideband includes 10 narrowbands. If a quantized value of a wideband amplitude coefficient is decreased by 1 bit each time, the quantity of bits occupied by the indication information may be decreased by a maximum of N bits; however, if a quantized value of a narrowband amplitude/phase coefficient is decreased by 1 bit each time, the quantity of bits occupied by the indication information may be decreased by 10 to 10N bits. Therefore, the following provides descriptions by using an example in which a quantization bit quantity of a wideband amplitude coefficient does not change. In actual practice, the quantity of bits occupied by the indication information may be deceased by decreasing quantization bit quantities of some wideband amplitude coefficients.

Generally, a narrowband phase needs to be quantized, and at least one of a wideband amplitude and a narrowband amplitude is quantized. Based on this, there may be the following three scenarios.

Scenario 1: A narrowband phase is quantized, and a wideband amplitude and a narrowband amplitude are quantized.

In this scenario, quantization bits of X, Y, and Z of the normalization reference component vector are all 0. A combination coefficient X of at least one non-normalization reference component vector is greater than 0, a combination coefficient Y of the at least one non-normalization reference component vector is greater than 0, and a combination coefficient Z of the at least one non-normalization reference component vector is greater than 0.

Figure 3:
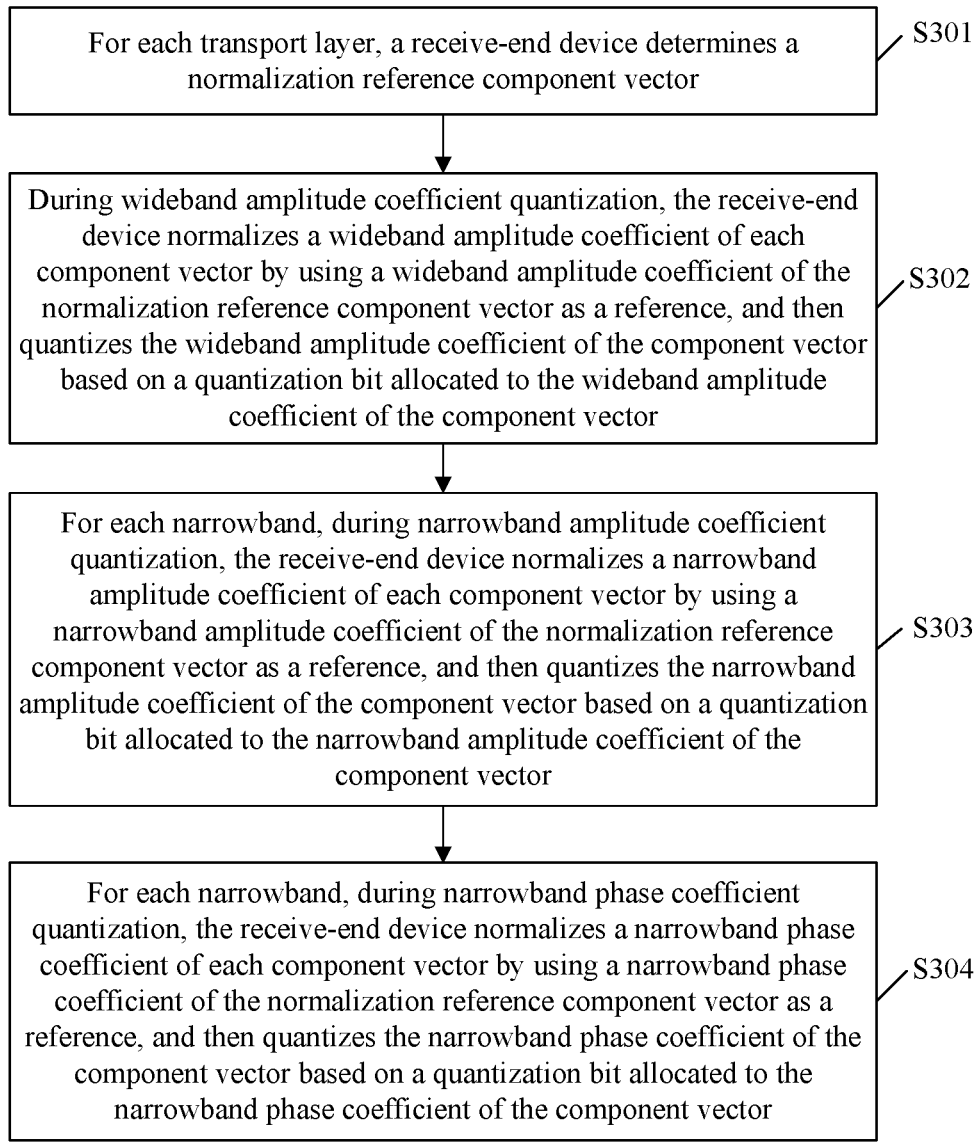
FIG. 3 is a schematic flowchart of a method for quantizing a combination coefficient according to an embodiment of this application.

For this scenario, this application provides a method for quantizing a combination coefficient. As shown in FIG. 3, the method may specifically include the following steps S301 to S304.

S301. For each transport layer, a receive-end device determines a normalization reference component vector.

For example, a component vector with a maximum wideband amplitude coefficient (if a wideband amplitude is a complex number, a modulus of the complex number is used) is used as the normalization reference component vector. The receive end may feedback an index of the normalization reference component vector to a transmit-end device after determining the normalization reference component vector. Optionally, the receive-end device may further feedback a wideband amplitude of the normalization reference component vector to the transmit-end device.

S302. During wideband amplitude coefficient quantization, the receive-end device normalizes a wideband amplitude coefficient of each component vector by using a wideband amplitude coefficient of the normalization reference component vector as a reference, and then quantizes the wideband amplitude coefficient of the component vector based on a quantization bit allocated to the wideband amplitude coefficient of the component vector.

In an embodiment provided in this application, a set of possible values of a quantized value of the wideband amplitude coefficient may be: –gap/2, –gap/2–gap, . . . , –gap/2–$(2^b-1)$gap, where b represents a quantization bit quantity of the wideband amplitude coefficient. Optionally, the gap is equal to 1.6 dB, 3 dB, or the like. For example, the gap is equal to 3 dB, and if a quantization bit quantity allocated by the receive-end device to a wideband amplitude coefficient of a component vector is 3 bits, possible values of the wideband amplitude coefficient of the component vector may be {–1.5, –4.5, –7.5, –10.5, –13.5 –16.5, –19.5, –22.5}. Certainly, in actual practice, the possible values of the wideband amplitude coefficient of the component vector may be some or all elements in the set. If a quantization bit quantity allocated by the receive-end device to a wideband amplitude coefficient of a component vector is 2 bits, possible values of the wideband amplitude coefficient of the component vector may be {–1.5, –4.5, –7.5, –10.5}. Certainly, in actual practice, the possible values of the wideband amplitude coefficient of the component vector may be some or all elements in the set. Other examples are not listed one by one. In this embodiment, wideband amplitude quantization is performed through even configuration in dB domain. In this case, because there is no 0 or 1 in the set, differential wideband amplitude quantization is facilitated. When the wideband amplitude coefficient is 0 or 1, differentiation can be performed only in one direction.

S303. For each narrowband, during narrowband amplitude coefficient quantization, the receive-end device normalizes a narrowband amplitude coefficient of each component vector by using a narrowband amplitude coefficient of the normalization reference component vector as a reference, and then quantizes the narrowband amplitude coefficient of the component vector based on a quantization bit allocated to the narrowband amplitude coefficient of the component vector.

S303 may be replaced with the following step: For each narrowband, during narrowband amplitude coefficient quantization, the receive-end device may not quantize a narrowband amplitude coefficient of the normalization reference component vector, and may quantize a narrowband amplitude coefficient of any one of other component vectors based on the following method:

If a wideband amplitude coefficient of a component vector is greater than a narrowband amplitude coefficient, a quantized value (for example, any value from $\alpha_1$ to $\alpha_{2L-1}$ in the foregoing formula W=$W_1 \times W_2$) of the narrowband amplitude coefficient may be a constant, for example, 1.2 dB. In this case, an index of the quantized value of the narrowband amplitude coefficient may be 1.

If a wideband amplitude coefficient of a component vector is less than a narrowband amplitude coefficient, a quantized value of the narrowband amplitude coefficient may be another constant, for example, –1.2 dB. In this case, an index of the quantized value of the narrowband amplitude coefficient may be 0.

It can be learned that the quantized value of the narrowband amplitude coefficient has two possible values. Therefore, the two possible values can be indicated when a quantization bit quantity of the narrowband amplitude coefficient is 1. This embodiment provides a method for quantizing a narrowband amplitude coefficient, and actual practice is not limited thereto.

S304. For each narrowband, during narrowband phase coefficient quantization, the receive-end device normalizes a narrowband phase coefficient of each component vector by using a narrowband phase coefficient of the normalization reference component vector as a reference, and then quantizes the narrowband phase coefficient of the component vector based on a quantization bit allocated to the narrowband phase coefficient of the component vector.

An order of performing S302 to S304 is not limited in this application.

In this scenario, an example of (X, Y, Z) of N component vectors may be expressed in the following form:

$$(X, Y, Z) = \begin{bmatrix} (0, 0, & & 0) \\ (p, 1, & & 3) \\ (p, \ldots, & \left.\begin{array}{c}\\ \\ \end{array}\right\} K_1 & 3) \\ (\ldots, 1, & & \ldots) \\ (p, 0, & & 3) \\ (p, 0, & \left.\begin{array}{c}\end{array}\right\} \text{The} & 2) \\ (\ldots, \ldots, & \left.\begin{array}{c}\end{array}\right\} \text{others} & \ldots) \\ (p, 0, & & 2) \end{bmatrix}_N \left.\begin{array}{c}\\ \\ \\ \\ \\ \\ \\ \\ \end{array}\right\} \begin{array}{l} K_2 \\ \\ \\ \text{The} \\ \text{others} \end{array},$$

where
$0 \leq K_1 \leq N-1$, and $0 \leq K_2 \leq N-1$; $K_1$ and $K_2$ may or may not be equal; generally, $K_1$ and $K_2$ are neither both 0 nor both N−1; and N is a total quantity of component vectors.

It may be understood that a quantization bit quantity of a wideband amplitude coefficient of each component vector other than the normalization reference component vector is p, where p may be 2, 3, or another value. A quantization bit quantity of a narrowband amplitude coefficient of each of $K_1$ component vectors is 1, and a quantization bit quantity of a narrowband amplitude coefficient of each of remaining component vectors is 0. A quantization bit quantity of a narrowband phase coefficient of each of $K_2$ component vectors is 3, and a quantization bit quantity of a narrowband phase coefficient of each of remaining component vectors is 2.

This embodiment is applied to an embodiment provided above. The first value may be 1, and the second value may be 0. In this case, a quantity of first values may be $K_1$, and a quantity of second values is $N-K_1$. The third value may be 3, and the fourth value may be 2. In this case, a quantity of third values is $K_2$, and a quantity of fourth values is $N-K_2$.

Example 1

If $K_1=K_2$, and both $K_1$ and $K_2$ are denoted as K, (X, Y, Z) of the N component vectors may be expressed in the following form:

$$(X, Y, Z) = \begin{bmatrix} (0, 0, & & 0) \\ (p, 1, & & 3) \\ (p, \ldots, & \left.\begin{array}{c}\\ \\ \end{array}\right\} K & \ldots) \\ (\ldots, 1, & & 3) \\ (p, 0, & & 2) \\ (p, 0, & \left.\begin{array}{c}\end{array}\right\} \text{The} & 2) \\ (\ldots, \ldots, & \left.\begin{array}{c}\end{array}\right\} \text{others} & \ldots) \\ (p, 0, & & 2) \end{bmatrix}_N \left.\begin{array}{c}\\ \\ \\ \\ \\ \\ \\ \\ \end{array}\right\} \begin{array}{l} K \\ \\ \\ \\ \text{The} \\ \text{others} \end{array}.$$

The following provides an example description of specific values of (X, Y, Z) by using an example in which L is equal to 2, 3, or 4, and p is equal to 2 or 3. L is a total quantity of component vectors in a single polarization direction. This application is described based on a dual polarization direction. Therefore, the total quantity N of component vectors is equal to 2L, and an actual practice is not limited thereto. In addition, in the following table, meanings of W_amp and X are the same, meanings of S_amp and Y are the same, and meanings of S_phase and Z are the same.

In this application, a "component vector index" may be an absolute index of a component vector, for example, an index of the component vector in a basic codebook or an absolute index of a beam corresponding to the component vector; or may be a relative index of a component vector, for example, an index of the component vector in the N component vectors. For ease of description, a "component vector index" in each of the following tables is indicated by using a relative index of a component vector, and relative indexes of all component vectors are consecutively sorted from 0. In addition, all the following tables are drawn based on sorting in descending order of impact of the N component vectors on an ideal precoding vector.

(1) L=2

When L=2, N=4, and K may be any value from 0 to 3. For example, p is equal to 2 or 3, and when K is any value from 0 to 3, (W_amp, S_amp, S_phase) of the N component vectors may be shown in Table 1:

TABLE 1

| | L = 2 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| | K = 0 | | | | K = 0 | | |
| 0 | 0 | 0 | 0 | 0 | 0 | 0 | 0 |
| 1 | 2 | 0 | 2 | 1 | 3 | 0 | 2 |
| 2 | 2 | 0 | 2 | 2 | 3 | 0 | 2 |
| 3 | 2 | 0 | 2 | 3 | 3 | 0 | 2 |
| | K = 1 | | | | K = 1 | | |
| 0 | 0 | 0 | 0 | 0 | 0 | 0 | 0 |
| 1 | 2 | 1 | 3 | 1 | 3 | 1 | 3 |
| 2 | 2 | 0 | 2 | 2 | 3 | 0 | 2 |
| 3 | 2 | 0 | 2 | 3 | 3 | 0 | 2 |
| | K = 2 | | | | K = 2 | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 0 | 2 | 3 | 3 | 0 | 2 |
| | K = 3 | | | | K = 3 | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |

The following describes the technical solution in Table 1 by using an example, shown in Table 1a, in Table 1.

TABLE 1a

| p = 2 | | | |
|---|---|---|---|
| Component vector index | W_amp | S_amp | S_phase |
| | K = 0 | | |
| 0 | 0 | 0 | 0 |
| 1 | 2 | 0 | 2 |
| 2 | 2 | 0 | 2 |
| 3 | 2 | 0 | 2 |

In Table 1a, N=4, that is, there are four component vectors, and indexes of the component vectors are 0, 1, 2, and 3. The component vector 0 is a normalization reference component vector, and quantization bit quantities of combination coefficients W_amp, W_amp, and S_phase of the component vector are all 0. The component vectors 1, 2, and 3 are non-normalization reference component vectors. It can be learned, from a matrix representation form of (X, Y, Z) in example 1, that p is equal to 2, and therefore W_amp of all the component vectors 1, 2, and 3 is 2. For a narrowband amplitude coefficient Y (namely S_amp), K=0, indicating that a quantity of component vectors whose Y (namely S_amp) is equal to 1 in the non-normalization reference component vectors is 0. That is, Y (namely S_amp) of all the non-normalization reference component vectors is 0. Similarly, for a narrowband phase coefficient Z (namely S_phase), K=0, indicating that a quantity of component vectors whose Z (namely S_phase) is equal to 3 in the non-normalization reference component vectors is 0. That is, Z (namely S_phase) of all the non-normalization reference component vectors is 2. Another example in Table 1 and each example in other tables in this application are similar thereto, and details are not described again.

The indication information provided in this application may include: generating indication information, and sending the indication information. The indication information is used to indicate a plurality of component vectors of an ideal precoding vector and a combination coefficient of each component vector, and the combination coefficient of the component vector includes at least one of the following types: a wideband amplitude coefficient, a narrowband amplitude coefficient, and a narrowband phase coefficient. When there are four component vectors, the four component vectors include a first component vector, a second component vector, a third component vector, and a fourth component vector. Based on the example shown in Table 1a, it can be learned that:

A quantization bit quantity of a wideband amplitude coefficient of the first component vector is 0, a quantization bit quantity of a narrowband amplitude coefficient of the first component vector is 0, and a quantization bit quantity of a narrowband phase coefficient of the first component vector is 0.

A quantization bit quantity of a wideband amplitude coefficient of the second component vector is 2, a quantization bit quantity of a narrowband amplitude coefficient of the second component vector is 0, and a quantization bit quantity of a narrowband phase coefficient of the second component vector is 2.

A quantization bit quantity of a wideband amplitude coefficient of the third component vector is 2, a quantization bit quantity of a narrowband amplitude coefficient of the third component vector is 0, and a quantization bit quantity of a narrowband phase coefficient of the third component vector is 2.

A quantization bit quantity of a wideband amplitude coefficient of the fourth component vector is 2, a quantization bit quantity of a narrowband amplitude coefficient of the fourth component vector is 0, and a quantization bit quantity of a narrowband phase coefficient of the fourth component vector is 2.

Optionally, the first component vector may be the component vector whose component vector index is 0 in Table 1a, that is, the normalization reference component vector. The second component vector, the third component vector, and the fourth component vector may be the component vectors whose component vector indexes are 1, 2, and 3 in Table 1a, respectively.

Persons skilled in the art should understand that quantization bit quantities of combination coefficients of component vectors in indication methods in other examples (including any example in Table 1 to Table 12 except Table 1a, or variations based on Table 1 to Table 12 in scenario 2 and scenario 3, or examples in other scenarios in which N is equal to 10, 12, 16, or the like) in this specification can all be deduced based on the foregoing descriptions, and are not listed one by one herein.

(2) L=3

When L=3, N=6, and K may be any value from 0 to 5. For example, p is equal to 2 or 3, and when K is any value from 0 to 5, (W_amp, S_amp, S_phase) of the N component vectors may be shown in Table 2:

TABLE 2

| L = 3 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 2 | 1 | 3 | 0 | 2 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| K = 1 | | | | K = 1 | | | |
| 0 | 0 | 0 | 0 | 0 | 0 | 0 | 0 |
| 1 | 2 | 1 | 3 | 1 | 3 | 1 | 3 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| K = 2 | | | | K = 2 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| K = 3 | | | | K = 3 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 0 | 2 | 4 | 3 | 0 | 2 |
| 5 | 2 | 0 | 2 | 5 | 3 | 0 | 2 |
| K = 4 | | | | K = 4 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 0 | 2 | 5 | 3 | 0 | 2 |
| K = 5 | | | | K = 5 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |

(3) L=4

When L=4, N=8, and K may be any value from 0 to 7. For example, p is equal to 2 or 3, and when K is any value from 0 to 7, (W_amp, S_amp, S_phase) of the N component vectors may be shown in Table 3:

TABLE 3

| L = 4 | | | | | | | |
|---|---|---|---|---|---|---|---|
| p =2 | | | | p =3 | | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 2 | 1 | 3 | 0 | 2 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 1 | | | | K = 1 | | | |
| 0 | 0 | 0 | 0 | 0 | 0 | 0 | 0 |
| 1 | 2 | 1 | 3 | 1 | 3 | 1 | 3 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 2 | | | | K = 2 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 3 | | | | K = 3 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 4 | | | | K = 4 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 5 | | | | K = 5 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 0 | 2 | 6 | 3 | 0 | 2 |
| 7 | 2 | 0 | 2 | 7 | 3 | 0 | 2 |
| K = 6 | | | | K = 6 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 1 | 3 | 6 | 3 | 1 | 3 |
| 7 | 2 | 0 | 2 | 7 | 3 | 0 | 2 |
| K = 7 | | | | K = 7 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 1 | 3 | 6 | 3 | 1 | 3 |
| 7 | 2 | 1 | 3 | 7 | 3 | 1 | 3 |

Example 2

If $K_2=0$, and $K_1$ is denoted as $K$, $(X, Y, Z)$ of the N component vectors may be expressed in the following form:

$$(X, Y, Z) = \begin{bmatrix} (0, 0, & & 0) \\ (p, 1, & & 3) \\ (p, \ldots, & \left.\right\} K \ldots) \\ (\ldots, 1, & & 3) \\ (p, 0, & & 3) \\ (p, 0, & \left.\right\} \text{The} & 3) \\ (\ldots, \ldots, & \left.\right\} \text{others} \ldots) \\ (p, 0, & & 3) \end{bmatrix}_N .$$

The following provides an example description of specific values of (X, Y, Z) by using an example in which L is equal to 2, 3, or 4, and p is equal to 2 or 3. For explanations of related content of L, W_amp, S_amp, S_phase, and the like, refer to example 1, and details are not described herein again.

(1) L=2

When L=2, N=4, and K may be any value from 0 to 3. For example, p is equal to 2 or 3, and when K is any value from 0 to 3, (W_amp, S_amp, S_phase) of the N component vectors may be shown in Table 4:

TABLE 4

| L = 2 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 3 | 1 | 3 | 0 | 3 |
| 2 | 2 | 0 | 3 | 2 | 3 | 0 | 3 |
| 3 | 2 | 0 | 3 | 3 | 3 | 0 | 3 |
| K = 1 | | | | K = 1 | | | |
| 0 | 0 | 0 | 0 | 0 | 0 | 0 | 0 |
| 1 | 2 | 1 | 3 | 1 | 3 | 1 | 3 |
| 2 | 2 | 0 | 3 | 2 | 3 | 0 | 3 |
| 3 | 2 | 0 | 3 | 3 | 3 | 0 | 3 |

TABLE 4-continued

| | L = 2 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| K = 2 | | | | K = 2 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 0 | 3 | 3 | 3 | 0 | 3 |
| K = 3 | | | | K = 3 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |

(2) L=3

When L=3, N=6, and K may be any value from 0 to 5. For example, p is equal to 2 or 3, and when K is any value from 0 to 5, (W_amp, S_amp, S_phase) of the N component vectors may be shown in Table 5:

TABLE 5

| | L = 3 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 3 | 1 | 3 | 0 | 3 |
| 2 | 2 | 0 | 3 | 2 | 3 | 0 | 3 |
| 3 | 2 | 0 | 3 | 3 | 3 | 0 | 3 |
| 4 | 2 | 0 | 3 | 4 | 3 | 0 | 3 |
| 5 | 2 | 0 | 3 | 5 | 3 | 0 | 3 |
| K = 1 | | | | K = 1 | | | |
| 0 | 0 | 0 | 0 | 0 | 0 | 0 | 0 |
| 1 | 2 | 1 | 3 | 1 | 3 | 1 | 3 |
| 2 | 2 | 0 | 3 | 2 | 3 | 0 | 3 |
| 3 | 2 | 0 | 3 | 3 | 3 | 0 | 3 |
| 4 | 2 | 0 | 3 | 4 | 3 | 0 | 3 |
| 5 | 2 | 0 | 3 | 5 | 3 | 0 | 3 |
| K = 2 | | | | K = 2 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 0 | 3 | 3 | 3 | 0 | 3 |
| 4 | 2 | 0 | 3 | 4 | 3 | 0 | 3 |
| 5 | 2 | 0 | 3 | 5 | 3 | 0 | 3 |
| K = 3 | | | | K = 3 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 0 | 3 | 4 | 3 | 0 | 3 |
| 5 | 2 | 0 | 3 | 5 | 3 | 0 | 3 |
| K = 4 | | | | K = 4 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |

TABLE 5-continued

| | L = 3 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| 4 | 2 | 1 | 3 | 4 | 3 | 1 | 3 |
| 5 | 2 | 0 | 3 | 5 | 3 | 0 | 3 |
| K = 5 | | | | K = 5 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |

(3) L=4

When L=4, N=8, and K may be any value from 0 to 7. For example, p is equal to 2 or 3, and when K is any value from 0 to 7, (W_amp, S_amp, S_phase) of the N component vectors may be shown in Table 6:

TABLE 6

| | L = 4 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 3 | 1 | 3 | 0 | 3 |
| 2 | 2 | 0 | 3 | 2 | 3 | 0 | 3 |
| 3 | 2 | 0 | 3 | 3 | 3 | 0 | 3 |
| 4 | 2 | 0 | 3 | 4 | 3 | 0 | 3 |
| 5 | 2 | 0 | 3 | 5 | 3 | 0 | 3 |
| 6 | 2 | 0 | 3 | 6 | 3 | 0 | 3 |
| 7 | 2 | 0 | 3 | 7 | 3 | 0 | 3 |
| K = 1 | | | | K = 1 | | | |
| 0 | 0 | 0 | 0 | 0 | 0 | 0 | 0 |
| 1 | 2 | 1 | 3 | 1 | 3 | 1 | 3 |
| 2 | 2 | 0 | 3 | 2 | 3 | 0 | 3 |
| 3 | 2 | 0 | 3 | 3 | 3 | 0 | 3 |
| 4 | 2 | 0 | 3 | 4 | 3 | 0 | 3 |
| 5 | 2 | 0 | 3 | 5 | 3 | 0 | 3 |
| 6 | 2 | 0 | 3 | 6 | 3 | 0 | 3 |
| 7 | 2 | 0 | 3 | 7 | 3 | 0 | 3 |
| K = 2 | | | | K = 2 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 0 | 3 | 3 | 3 | 0 | 3 |
| 4 | 2 | 0 | 3 | 4 | 3 | 0 | 3 |
| 5 | 2 | 0 | 3 | 5 | 3 | 0 | 3 |
| 6 | 2 | 0 | 3 | 6 | 3 | 0 | 3 |
| 7 | 2 | 0 | 3 | 7 | 3 | 0 | 3 |
| K = 3 | | | | K = 3 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 0 | 3 | 4 | 3 | 0 | 3 |
| 5 | 2 | 0 | 3 | 5 | 3 | 0 | 3 |
| 6 | 2 | 0 | 3 | 6 | 3 | 0 | 3 |
| 7 | 2 | 0 | 3 | 7 | 3 | 0 | 3 |

TABLE 6-continued

| L = 4 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 4 | | | | K = 4 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 0 | 3 | 5 | 3 | 0 | 3 |
| 6 | 2 | 0 | 3 | 6 | 3 | 0 | 3 |
| 7 | 2 | 0 | 3 | 7 | 3 | 0 | 3 |
| K = 5 | | | | K = 5 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 0 | 3 | 6 | 3 | 0 | 3 |
| 7 | 2 | 0 | 3 | 7 | 3 | 0 | 3 |
| K = 6 | | | | K = 6 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 1 | 3 | 6 | 3 | 1 | 3 |
| 7 | 2 | 0 | 3 | 7 | 3 | 0 | 3 |
| K = 7 | | | | K = 7 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 1 | 3 | 6 | 3 | 1 | 3 |
| 7 | 2 | 1 | 3 | 7 | 3 | 1 | 3 |

Example 3

If $K_2 = N-1$, and $K_1$ is denoted as K, (X, Y, Z) of a plurality of component vectors may be expressed in the following form:

$$(X, Y, Z) = \begin{bmatrix} (0, 0, & & 0) \\ (p, 1, & & 2) \\ (p, \ldots, & & \ldots) \\ (\ldots, 1, & K & 2) \\ (p, 0, & & 2) \\ (p, 0, & \text{The} & 2) \\ (\ldots, \ldots, & \text{others} & \ldots) \\ (p, 0, & & 2) \end{bmatrix}_N$$

The following provides an example description of specific values of (X, Y, Z) by using an example in which L is equal to 2, 3, or 4, and p is equal to 2 or 3. For explanations of related content of L, W_amp, S_amp, S_phase, and the like, refer to example 1, and details are not described herein again.

(1) L=2

When L=2, N=4, and K may be any value from 0 to 3. For example, p is equal to 2 or 3, and when K is any value from 0 to 3, (W_amp, S_amp, S_phase) of the N component vectors may be shown in Table 7:

TABLE 7

| L = 2 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 2 | 1 | 3 | 0 | 2 |
| 2 | 2 | 0 | 2 | 2 | 3 | 0 | 2 |
| 3 | 2 | 0 | 2 | 3 | 3 | 0 | 2 |
| K = 1 | | | | K = 1 | | | |
| 0 | 0 | 0 | 0 | 0 | 0 | 0 | 0 |
| 1 | 2 | 1 | 2 | 1 | 3 | 1 | 2 |
| 2 | 2 | 0 | 2 | 2 | 3 | 0 | 2 |
| 3 | 2 | 0 | 2 | 3 | 3 | 0 | 2 |
| K = 2 | | | | K = 2 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 0 | 2 | 3 | 3 | 0 | 2 |
| K = 3 | | | | K = 3 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |

(2) L=3

When L=3, N=6, and K may be any value from 0 to 5. For example, p is equal to 2 or 3, and when K is any value from 0 to 5, (W_amp, S_amp, S_phase) of the N component vectors may be shown in Table 8:

TABLE 8

| L = 3 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 2 | 1 | 3 | 0 | 2 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| K = 1 | | | | K = 1 | | | |
| 0 | 0 | 0 | 0 | 0 | 0 | 0 | 0 |
| 1 | 2 | 1 | 2 | 1 | 3 | 1 | 2 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |

TABLE 8-continued

| | L = 3 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| K = 2 | | | | K = 2 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| K = 3 | | | | K = 3 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 0 | 2 | 4 | 3 | 0 | 2 |
| 5 | 2 | 0 | 2 | 5 | 3 | 0 | 2 |
| K = 4 | | | | K = 4 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 0 | 2 | 5 | 3 | 0 | 2 |
| K = 5 | | | | K = 5 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |

(3) L=4

When L=4, N=8, and K may be any value from 0 to 7. For example, p is equal to 2 or 3, and when K is any value from 0 to 7, (W_amp, S_amp, S_phase) of the N component vectors may be shown in Table 9:

TABLE 9

| | L = 4 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 2 | 1 | 3 | 0 | 2 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 1 | | | | K = 1 | | | |
| 0 | 0 | 0 | 0 | 0 | 0 | 0 | 0 |
| 1 | 2 | 1 | 2 | 1 | 3 | 1 | 2 |
| 2 | 2 | 0 | 2 | 2 | 3 | 0 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 2 | | | | K = 2 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 0 | 2 | 3 | 3 | 0 | 2 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 3 | | | | K = 3 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 0 | 2 | 4 | 3 | 0 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 4 | | | | K = 4 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 0 | 2 | 5 | 3 | 0 | 2 |
| 6 | 2 | 0 | 2 | 6 | 3 | 0 | 2 |
| 7 | 2 | 0 | 2 | 7 | 3 | 0 | 2 |
| K = 5 | | | | K = 5 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| 6 | 2 | 0 | 2 | 6 | 3 | 0 | 2 |
| 7 | 2 | 0 | 2 | 7 | 3 | 0 | 2 |
| K = 6 | | | | K = 6 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| 6 | 2 | 1 | 2 | 6 | 3 | 1 | 2 |
| 7 | 2 | 0 | 2 | 7 | 3 | 0 | 2 |
| K = 7 | | | | K = 7 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| 6 | 2 | 1 | 2 | 6 | 3 | 1 | 2 |
| 7 | 2 | 1 | 2 | 7 | 3 | 1 | 2 |

Example 4

If $K_1=N-1$, and $K_2$ is denoted as K, (X, Y, Z) of the N component vectors may be expressed in the following form:

$$(X, Y, Z) = \begin{bmatrix} (0, & 0, & 0) \\ (p, & 1, & 3) \\ (p, & \ldots, & \ldots) \\ (\ldots, & 1, & 3) \\ (p, & 1, & 2) \\ (p, & 1, & 2) \\ (\ldots, & \ldots, & \ldots) \\ (p, & 1, & 2) \end{bmatrix}_N \begin{matrix} \Big\} K \\ \\ \Big\} \text{The others} \end{matrix}$$

The following provides an example description of specific values of (X, Y, Z) by using an example in which L is equal to 2, 3, or 4, and p is equal to 2 or 3. For explanations of related content of L, W_amp, S_amp, S_phase, and the like, refer to example 1, and details are not described herein again.

(1) L=2

When L=2, N=4, and K may be any value from 0 to 3. For example, p is equal to 2 or 3, and when K is any value from 0 to 3, (W_amp, S_amp, S_phase) of the N component vectors may be shown in Table 10:

TABLE 10

| L = 2 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 0 | | | | | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| K = 1 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 2 | 2 | 3 | 1 | 2 |
| 3 | 2 | 1 | 2 | 3 | 3 | 1 | 2 |
| K = 2 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 2 | 3 | 3 | 1 | 2 |
| K = 3 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |

(2) L=3

When L=3, N=6, and K may be any value from 0 to 5. For example, p is equal to 2 or 3, and when K is any value from 0 to 5, (W_amp, S_amp, S_phase) of the N component vectors may be shown in Table 11:

TABLE 11

| L = 3 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 0 | | | | | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| K = 1 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| K = 2 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| K = 3 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 2 | 4 | 3 | 1 | 2 |
| 5 | 2 | 1 | 2 | 5 | 3 | 1 | 2 |
| K = 4 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 2 | 5 | 3 | 1 | 2 |
| K = 5 | | | | | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |

(3) L=4

When L=4, N=8, and K may be any value from 0 to 7. For example, p is equal to 2 or 3, and when K is any value from 0 to 7, (W_amp, S_amp, S_phase) of the N component vectors may be shown in Table 12:

TABLE 12

| | L = 4 | | | | | | |
|---|---|---|---|---|---|---|---|
| | p = 2 | | | | p = 3 | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 1 | 2 | 1 | 3 | 1 | 2 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| 6 | 2 | 1 | 2 | 6 | 3 | 1 | 2 |
| 7 | 2 | 1 | 2 | 7 | 3 | 1 | 2 |
| K = 1 | | | | K = 1 | | | |
| 0 | 0 | 0 | 0 | 0 | 0 | 0 | 0 |
| 1 | 2 | 1 | 3 | 1 | 3 | 1 | 3 |
| 2 | 2 | 1 | 2 | 2 | 3 | 1 | 2 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| 6 | 2 | 1 | 2 | 6 | 3 | 1 | 2 |
| 7 | 2 | 1 | 2 | 7 | 3 | 1 | 2 |
| K = 2 | | | | K = 2 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 2 | 3 | 3 | 1 | 2 |
| 4 | 2 | 1 | 2 | 4 | 3 | 1 | 2 |
| 5 | 2 | 1 | 2 | 5 | 3 | 1 | 2 |
| 6 | 2 | 1 | 2 | 6 | 3 | 1 | 2 |
| 7 | 2 | 1 | 2 | 7 | 3 | 1 | 2 |
| K = 3 | | | | K = 3 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 2 | 4 | 3 | 1 | 2 |
| 5 | 2 | 1 | 2 | 5 | 3 | 1 | 2 |
| 6 | 2 | 1 | 2 | 6 | 3 | 1 | 2 |
| 7 | 2 | 1 | 2 | 7 | 3 | 1 | 2 |
| K = 4 | | | | K = 4 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 2 | 5 | 3 | 1 | 2 |
| 6 | 2 | 1 | 2 | 6 | 3 | 1 | 2 |
| 7 | 2 | 1 | 2 | 7 | 3 | 1 | 2 |
| K = 5 | | | | K = 5 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 1 | 2 | 6 | 3 | 1 | 2 |
| 7 | 2 | 1 | 2 | 7 | 3 | 1 | 2 |
| K = 6 | | | | K = 6 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 1 | 3 | 6 | 3 | 1 | 3 |
| 7 | 2 | 1 | 2 | 7 | 3 | 1 | 2 |
| K = 7 | | | | K = 7 | | | |
| 0 | 0 | 0 | 0 | 0 | 0 | 0 | 0 |
| 1 | 2 | 1 | 3 | 1 | 3 | 1 | 3 |
| 2 | 2 | 1 | 3 | 2 | 3 | 1 | 3 |
| 3 | 2 | 1 | 3 | 3 | 3 | 1 | 3 |
| 4 | 2 | 1 | 3 | 4 | 3 | 1 | 3 |
| 5 | 2 | 1 | 3 | 5 | 3 | 1 | 3 |
| 6 | 2 | 1 | 3 | 6 | 3 | 1 | 3 |
| 7 | 2 | 1 | 3 | 7 | 3 | 1 | 3 |

Scenario 2: A narrowband phase is quantized, a narrowband amplitude is quantized, and a wideband amplitude is not quantized.

In this scenario, a quantization bit allocation form of a combination coefficient of each non-normalization reference component vector may be expressed as (0, X, Y), where a combination coefficient Y of at least one non-normalization reference component vector is greater than 0, and a combination coefficient Z of the at least one non-normalization reference component vector is greater than 0.

Figure 4:
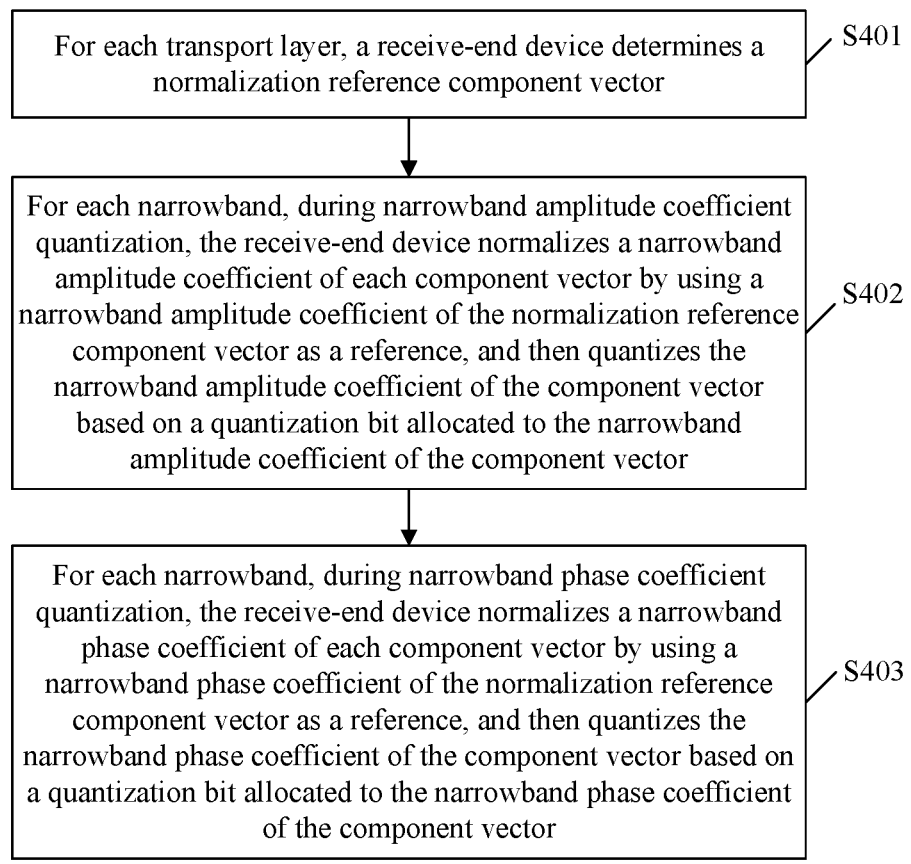
FIG. 4 is a schematic flowchart of a method for quantizing a combination coefficient according to an embodiment of this application.

For this scenario, this application provides a method for quantizing a combination coefficient. As shown in FIG. 4, the method may specifically include the following steps S401 to S403.

S401. Refer to S301.

For example, in S401, the normalization reference component vector may alternatively be determined in the following manner: For all narrowbands, the receive-end device determines a component vector with a maximum narrowband amplitude coefficient and uses the component vector as the normalization reference component vector. Quantization bits of X, Y, and Z of the normalization reference component vector are all 0. The receive-end device may further feedback an index of the normalization reference component vector to a transmit-end device. Optionally, the receive-end device may further feedback a narrowband amplitude of the normalization reference component vector to the transmit-end device.

S402. Refer to S303.

S403. Refer to S304.

An order of performing S402 and S403 is not limited in this application.

In this scenario, an example of (X, Y, Z) of N component vectors may be expressed in the following form:

$$(X, Y, Z) = \begin{bmatrix} (0, 0, & 0) \\ (0, 1, & 3) \\ (0, \ldots, & 3) \\ (\ldots, 1, & \ldots) \\ (0, 0, & 3) \\ (0, 0, & \text{The } 2) \\ (\ldots, \ldots, & \text{others} \ldots) \\ (0, 0, & 2) \end{bmatrix}_N \begin{matrix} \left.\begin{matrix} \\ \\ \\ \end{matrix}\right\} K_1 \\ \left.\begin{matrix} \\ \\ \\ \end{matrix}\right\} \text{The others} \end{matrix} \Bigg\} K_2,$$

where
$0 \leq K_1 \leq N-1$, and $0 \leq K_2 \leq N-1$; $K_1$ and $K_2$ may or may not be equal; generally, $K_1$ and $K_2$ are neither both 0 nor both $N-1$; and N is a total quantity of component vectors.

Because the wideband amplitude coefficient is not quantized in this scenario, a quantization bit quantity of a wideband amplitude coefficient of each component vector is 0. Except the normalization reference component vector, a quantization bit quantity of a narrowband amplitude coefficient of each of $K_1$ component vectors is 1, and a quantization bit quantity of a narrowband amplitude coefficient of each of remaining component vectors is 0. A quantization bit quantity of a narrowband phase coefficient of each of $K_2$ component vectors is 3, and a quantization bit quantity of a narrowband phase coefficient of each of remaining component vectors is 2.

This embodiment is applied to an embodiment provided above. The first value may be 1, and the second value may be 0. In this case, a quantity of first values may be $K_1$, and a quantity of second values is $N-K_1$. The third value may be 3, and the fourth value may be 2. In this case, a quantity of third values is $K_2$, and a quantity of fourth values is $N-K_2$.

It may be understood that examples in this scenario can be obtained by modifying matrix forms of (X, Y, Z) of the plurality of component vectors in the foregoing examples 1 to 4 and (W_amp, S_amp, S_phase) shown in Table 1 to Table 12. For example, a form obtained after p in a matrix form of (X, Y, Z) of the plurality of component vectors in the foregoing examples 1 to 4 is all replaced with 0 can be used as an example in this scenario. A table obtained after p=2 is all replaced with p=0, W_amp is all changed from 2 to 0, and (W_amp, S_amp, S_phase) related to p=3 is deleted in each of the foregoing Table 1 to Table 12 can be used as an example in this scenario. Alternatively, a table obtained after p=3 is all replaced with p=0, W_amp is all changed from 2 to 0, and (W_amp, S_amp, S_phase) related to p=2 is deleted in each of the foregoing Table 1 to Table 12 can be used as an example in this scenario.

For example, when L=2, N=4, and K may be any value from 0 to 3. When a value of K is any value from 0 to 3, (W_amp, S_amp, S_phase) of the N component vectors may be a table obtained after p=2 is all replaced with p=0, W_amp is all changed from 2 to 0, and (W_amp, S_amp, S_phase) related to p=3 is deleted in Table 1, as shown in Table 13:

TABLE 13

| Component vector index | W_amp | S_amp | S_phase |
|---|---|---|---|
| p = 2 | | | |
| K = 0 | | | |
| 0 | 0 | 0 | 0 |
| p = 2 | | | |
| 1 | 0 | 0 | 2 |
| 2 | 0 | 0 | 2 |
| 3 | 0 | 0 | 2 |
| K = 1 | | | |
| 0 | 0 | 0 | 0 |
| 1 | 0 | 1 | 3 |
| 2 | 0 | 0 | 2 |
| 3 | 0 | 0 | 2 |
| K = 2 | | | |
| 0 | 0 | 0 | 0 |
| 1 | 0 | 1 | 3 |
| 2 | 0 | 1 | 3 |
| 3 | 0 | 0 | 2 |

TABLE 13-continued

| Component vector index | W_amp | S_amp | S_phase |
|---|---|---|---|
| p = 2 | | | |
| K = 3 | | | |
| 0 | 0 | 0 | 0 |
| 1 | 0 | 1 | 3 |
| 2 | 0 | 1 | 3 |
| 3 | 0 | 1 | 3 |

Other examples are not listed one by one.

Scenario 3: A narrowband phase is quantized, a wideband amplitude is quantized, and a narrowband amplitude is not quantized.

In this scenario, a quantization bit allocation form of a combination coefficient of each non-normalization reference component vector may be expressed as (X, 0, Z). A combination coefficient X of at least one non-normalization reference component vector is greater than 0, and a combination coefficient Z of the at least one non-normalization reference component vector is greater than 0.

Figure 5:
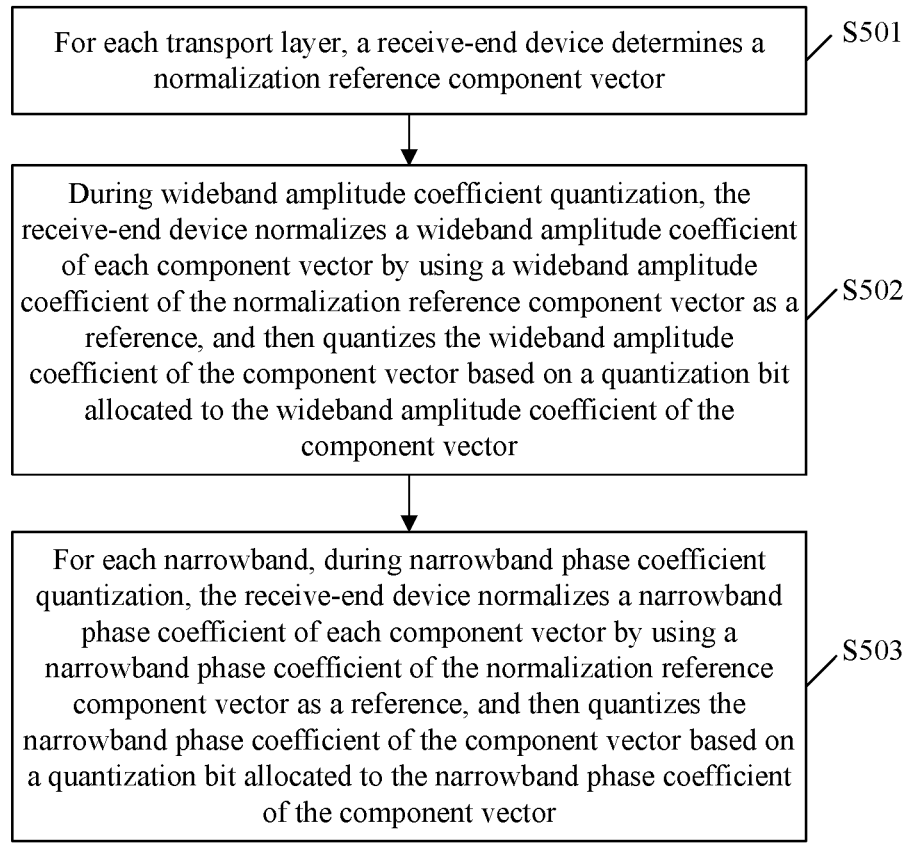
FIG. 5 is a schematic flowchart of a method for quantizing a combination coefficient according to an embodiment of this application.

For this scenario, this application provides a method for quantizing a combination coefficient. As shown in FIG. 5, the method may specifically include the following steps S501 to S503.

S501. Refer to S301.

Optionally, the receive-end device may further feedback an index of the normalization reference component vector to a transmit-end device. In practice, the receive-end device may further feedback a wideband amplitude of the normalization reference component vector to the transmit-end device.

S502. Refer to S302.

S503. Refer to S304.

An order of performing S502 and S503 is not limited in this application.

In this scenario, an example of (X, Y, Z) of N component vectors may be expressed in the following form:

$$(X, Y, Z) = \begin{bmatrix} (0, & 0, & 0) \\ (p, & 0, & 3) \\ (p, & 0, & 3) \\ (..., & ..., & ...) \\ (p, & 0, & 3) \\ (p, & 0, & 2) \\ (..., & ..., & ...) \\ (p, & 0, & 2) \end{bmatrix}_N \begin{matrix} \\ \left.\vphantom{\begin{matrix}a\\a\\a\\a\end{matrix}}\right\} K \\ \\ \\ \left.\vphantom{\begin{matrix}a\\a\\a\end{matrix}}\right\} \text{The others} \end{matrix},$$

where $0 < K < N-1$, and N is a total quantity of component vectors.

Because the narrowband amplitude coefficient is not quantized in this scenario, a quantization bit quantity of a narrowband amplitude coefficient of each component vector is 0. A wideband amplitude coefficient of the normalization reference component vector is 0. A quantization bit quantity of a wideband amplitude coefficient of a non-normalization reference component vector is p, where p may be 2, 3, or another value. A quantization bit quantity of a narrowband phase coefficient of each of K non-normalization reference component vectors is 3, and a quantization bit quantity of a narrowband phase coefficient of each of remaining component vectors is 2.

This embodiment is applied to an embodiment provided above. The third value may be 3, and the fourth value may be 2. In this case, a quantity of third values is K, and a quantity of fourth values is N−K.

It may be understood that examples in this scenario can be obtained by modifying matrix forms of (X, Y, Z) of the N component vectors in the foregoing examples 1 to 4 and (W_amp, S_amp, S_phase) shown in Table 1 to Table 12. For example, an example in this scenario may be obtained by setting all S_amp in each of the foregoing Table 1 to Table 12 to 0.

For example, when L=2, N=4, and K may be any value from 0 to 3. When a value of K is any value from 0 to 3, (W_amp, S_amp, S_phase) of the N component vectors may be a table obtained after S_amp in Table 1 is all set to 0, as shown in Table 14:

TABLE 14

| L = 2 | | | | | | | |
|---|---|---|---|---|---|---|---|
| p = 2 | | | | p = 3 | | | |
| Component vector index | W_amp | S_amp | S_phase | Component vector index | W_amp | S_amp | S_phase |
| K = 0 | | | | K = 0 | | | |
| 0 | 0 | 0 | 0 | 0 | 0 | 0 | 0 |
| 1 | 2 | 0 | 2 | 1 | 3 | 0 | 2 |
| 2 | 2 | 0 | 2 | 2 | 3 | 0 | 2 |
| 3 | 2 | 0 | 2 | 3 | 3 | 0 | 2 |
| K = 1 | | | | K = 1 | | | |
| 0 | 0 | 0 | 0 | 0 | 0 | 0 | 0 |
| 1 | 2 | 0 | 3 | 1 | 3 | 0 | 3 |
| 2 | 2 | 0 | 2 | 2 | 3 | 0 | 2 |
| 3 | 2 | 0 | 2 | 3 | 3 | 0 | 2 |
| K = 2 | | | | K = 2 | | | |
| 0 | 0 | 0 | 0 | 0 | 0 | 0 | 0 |
| 1 | 2 | 0 | 3 | 1 | 3 | 0 | 3 |
| 2 | 2 | 0 | 3 | 2 | 3 | 0 | 3 |
| 3 | 2 | 0 | 2 | 3 | 3 | 0 | 2 |
| K = 3 | | | | K = 3 | | | |
| 0 | 0 | 0 | 0 | 0 | 0 | 0 | 0 |
| 1 | 2 | 0 | 3 | 1 | 3 | 0 | 3 |
| 2 | 2 | 0 | 3 | 2 | 3 | 0 | 3 |
| 3 | 2 | 0 | 3 | 3 | 3 | 0 | 3 |

Other examples are not listed one by one.

The following uses specific examples to describe beneficial effects of the technical solutions provided in this application.

For Scenario 1

(1) Assuming that L=2 and p=2, (X, Y, Z) of the N component vectors in the prior art may be expressed in the following form:

$$(X, Y, Z) = \begin{bmatrix} (0, 0, 0) \\ (2, 1, 3) \\ (2, 1, 3) \\ (2, 1, 3) \end{bmatrix}.$$

If $K_1$=2 and $K_2$=1, (X, Y, Z) of the N component vectors in this application may be expressed in the following form:

$$(X, Y, Z) = \begin{bmatrix} (0, 0, 0) \\ (2, 1, 3) \\ (2, 1, 2) \\ (2, 0, 2) \end{bmatrix}.$$

In this case, it can be learned through simulation that precision of a precoding vector is decreased by 3.5%, and overheads for feeding back indication information indicating a combination coefficient are decreased by 23.8%.

If $K_1$=$K_2$=1, (X, Y, Z) of the N component vectors in this application may be expressed in the following form:

$$(X, Y, Z) = \begin{bmatrix} (0, 0, 0) \\ (2, 1, 3) \\ (2, 0, 2) \\ (2, 0, 2) \end{bmatrix}.$$

In this case, it can be learned through simulation that precision of a precoding vector obtained based on the N component vectors is decreased by 4.8%, and overheads for feeding back indication information indicating a combination coefficient are decreased by 31.7%.

(2) Assuming that L=3 and p=2, (X, Y, Z) of the N component vectors in the prior art may be expressed in the following form:

$$(X, Y, Z) = \begin{bmatrix} (0, 0, 0) \\ (2, 1, 3) \\ (2, 1, 3) \\ (2, 1, 3) \\ (2, 1, 3) \\ (2, 1, 3) \end{bmatrix}.$$

If $K_1$=5 and $K_2$=1, (X, Y, Z) of the N component vectors in this application may be expressed in the following form:

$$(X, Y, Z) = \begin{bmatrix} (0, 0, 0) \\ (2, 1, 3) \\ (2, 1, 2) \\ (2, 1, 2) \\ (2, 1, 2) \\ (2, 1, 2) \end{bmatrix}.$$

In this case, it can be learned through simulation that precision of a precoding vector obtained based on the N component vectors is decreased by 3.1%, and overheads for feeding back indication information indicating a combination coefficient are decreased by 19.0%.

If $K_1$=$K_2$=1, (X, Y, Z) of the N component vectors in this application may be expressed in the following form:

$$(X, Y, Z) = \begin{bmatrix} (0, 0, 0) \\ (2, 1, 3) \\ (2, 0, 2) \\ (2, 0, 2) \\ (2, 0, 2) \\ (2, 0, 2) \end{bmatrix}.$$

In this case, it can be learned through simulation that precision of a precoding vector obtained based on the N component vectors is decreased by 5.7%, and overheads for feeding back indication information indicating a combination coefficient are decreased by 28.7%.

(3) Assuming that L=4 and p=2, (X, Y, Z) of the N component vectors in the prior art may be expressed in the following form:

$$(X, Y, Z) = \begin{bmatrix} (0, 0, 0) \\ (2, 1, 3) \\ (2, 1, 3) \\ (2, 1, 3) \\ (2, 1, 3) \\ (2, 1, 3) \\ (2, 1, 3) \\ (2, 1, 3) \end{bmatrix}.$$

If $K_1=7$ and $K_2=1$, (X, Y, Z) of the N component vectors in this application may be expressed in the following form:

$$(X, Y, Z) = \begin{bmatrix} (0, 0, 0) \\ (2, 1, 3) \\ (2, 1, 2) \\ (2, 1, 2) \\ (2, 1, 2) \\ (2, 1, 2) \\ (2, 1, 2) \\ (2, 1, 2) \end{bmatrix}.$$

In this case, it can be learned through simulation that precision of a precoding vector obtained based on the N component vectors is decreased by 4.1%, and overheads for feeding back indication information indicating a combination coefficient are decreased by 20.4%.

If $K_1=K_2=3$, (X, Y, Z) of the N component vectors in this application may be expressed in the following form:

$$(X, Y, Z) = \begin{bmatrix} (0, 0, 0) \\ (2, 1, 3) \\ (2, 1, 3) \\ (2, 1, 3) \\ (2, 0, 2) \\ (2, 0, 2) \\ (2, 0, 2) \\ (2, 0, 2) \end{bmatrix}.$$

In this case, it can be learned through simulation that precision of a precoding vector obtained based on the N component vectors is decreased by 6.5%, and overheads for feeding back indication information indicating a combination coefficient are decreased by 27.2%.

For Scenario 2

(1) Assuming that L=2, (X, Y, Z) of the N component vectors in the prior art may be expressed in the following form:

$$(X, Y, Z) = \begin{bmatrix} (0, 0, 0) \\ (0, 2, 3) \\ (0, 2, 3) \\ (0, 2, 3) \end{bmatrix}.$$

If $K_1=3$ and $K_2=1$, (X, Y, Z) of the N component vectors in this application may be expressed in the following form:

$$(X, Y, Z) = \begin{bmatrix} (0, 0, 0) \\ (0, 1, 3) \\ (0, 1, 2) \\ (0, 1, 2) \end{bmatrix}.$$

In this case, it can be learned through simulation that precision of a precoding vector obtained based on the N component vectors is decreased by 2.9%, and overheads for feeding back indication information indicating a combination coefficient are decreased by 33.3%.

(2) Assuming that L=3, (X, Y, Z) of the N component vectors in the prior art may be expressed in the following form:

$$(X, Y, Z) = \begin{bmatrix} (0, 0, 0) \\ (0, 2, 3) \\ (0, 2, 3) \\ (0, 2, 3) \\ (0, 2, 3) \\ (0, 2, 3) \end{bmatrix}.$$

If $K_1=5$ and $K_2=2$, (X, Y, Z) of the N component vectors in this application may be expressed in the following form:

$$(X, Y, Z) = \begin{bmatrix} (0, 0, 0) \\ (0, 1, 3) \\ (0, 1, 3) \\ (0, 1, 2) \\ (0, 1, 2) \\ (0, 1, 2) \end{bmatrix}.$$

In this case, it can be learned through simulation that precision of a precoding vector obtained based on the N component vectors is decreased by 2.4%, and overheads for feeding back indication information indicating a combination coefficient are decreased by 32.0%.

(3) Assuming that L=4, (X, Y, Z) of the N component vectors in the prior art may be expressed in the following form:

$$(X, Y, Z) = \begin{bmatrix} (0, 0, 0) \\ (0, 2, 3) \\ (0, 2, 3) \\ (0, 2, 3) \\ (0, 2, 3) \\ (0, 2, 3) \\ (0, 2, 3) \\ (0, 2, 3) \end{bmatrix}.$$

If $K_1=7$ and $K_2=2$, (X, Y, Z) of the N component vectors in this application may be expressed in the following form:

$$(X, Y, Z) = \begin{bmatrix} (0, 0, 0) \\ (0, 1, 3) \\ (0, 1, 3) \\ (0, 1, 2) \\ (0, 1, 2) \\ (0, 1, 2) \\ (0, 1, 2) \\ (0, 1, 2) \end{bmatrix}.$$

In this case, it can be learned through simulation that precision of a precoding vector obtained based on the N component vectors is decreased by 2.8%, and overheads for feeding back indication information indicating a combination coefficient are decreased by 34.3%.

For Scenario 3

(1) Assuming that L=2 and p=2, (X, Y, Z) of the N component vectors in the prior art may be expressed in the following form:

$$(X, Y, Z) = \begin{bmatrix} (0, 0, 0) \\ (2, 0, 3) \\ (2, 0, 3) \\ (2, 0, 3) \end{bmatrix}.$$

If K=1, (X, Y, Z) of the N component vectors in this application may be expressed in the following form:

$$(X, Y, Z) = \begin{bmatrix} (0, 0, 0) \\ (2, 0, 3) \\ (2, 0, 2) \\ (2, 0, 2) \end{bmatrix}.$$

In this case, it can be learned through simulation that precision of a precoding vector obtained based on the N component vectors is decreased by 1.5%, and overheads for feeding back indication information indicating a combination coefficient are decreased by 20.8%.

(2) Assuming that L=3 and p=2, (X, Y, Z) of the N component vectors in the prior art may be expressed in the following form:

$$(X, Y, Z) = \begin{bmatrix} (0, 0, 0) \\ (2, 0, 3) \\ (2, 0, 3) \\ (2, 0, 3) \\ (2, 0, 3) \\ (2, 0, 3) \end{bmatrix}.$$

If K=1, (X, Y, Z) of the N component vectors in this application may be expressed in the following form:

$$(X, Y, Z) = \begin{bmatrix} (0, 0, 0) \\ (2, 0, 3) \\ (2, 0, 2) \\ (2, 0, 2) \\ (2, 0, 2) \\ (2, 0, 2) \end{bmatrix}.$$

In this case, it can be learned through simulation that precision of a precoding vector obtained based on the N component vectors is decreased by 3.1%, and overheads for feeding back indication information indicating a combination coefficient are decreased by 25.0%.

(3) Assuming that L=4 and p=2, (X, Y, Z) of the N component vectors in the prior art may be expressed in the following form:

$$(X, Y, Z) = \begin{bmatrix} (0, 0, 0) \\ (2, 0, 3) \\ (2, 0, 3) \\ (2, 0, 3) \\ (2, 0, 3) \\ (2, 0, 3) \\ (2, 0, 3) \\ (2, 0, 3) \end{bmatrix}.$$

If K=2, (X, Y, Z) of the N component vectors in this application may be expressed in the following form:

$$(X, Y, Z) = \begin{bmatrix} (0, 0, 0) \\ (2, 0, 3) \\ (2, 0, 3) \\ (2, 0, 2) \\ (2, 0, 2) \\ (2, 0, 2) \\ (2, 0, 2) \\ (2, 0, 2) \end{bmatrix}.$$

In this case, it can be learned through simulation that precision of a precoding vector obtained based on the N component vectors is decreased by 2.8%, and overheads for feeding back indication information indicating a combination coefficient are decreased by 22.3%.

Figure 6:
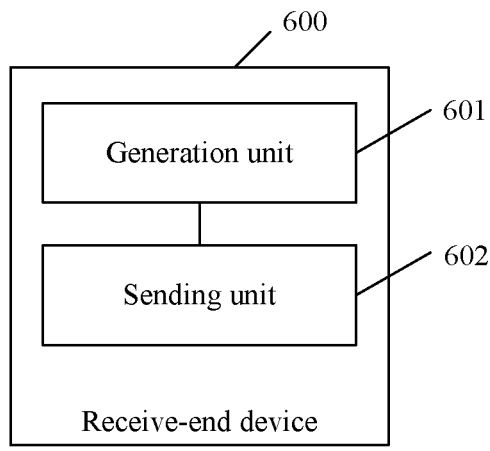
FIG. 6 is a schematic diagram of an example of a logical structure of a receive-end device according to an embodiment of this application.

FIG. 6 is a schematic diagram of an example of a logical structure of a receive-end device 600 according to an embodiment of this application. As shown in FIG. 6, the receive-end device 600 includes a generation unit 601 and a sending unit 602. The generation unit 601 may be configured to perform S201 in FIG. 2 and/or perform another step described in this application. The sending unit 602 may be configured to perform S202 in FIG. 2 and/or perform another step described in this application.

The receive-end device 600 is configured to execute the corresponding methods. Related technical content has been clearly described above, and therefore details are not described herein again.

Figure 7:
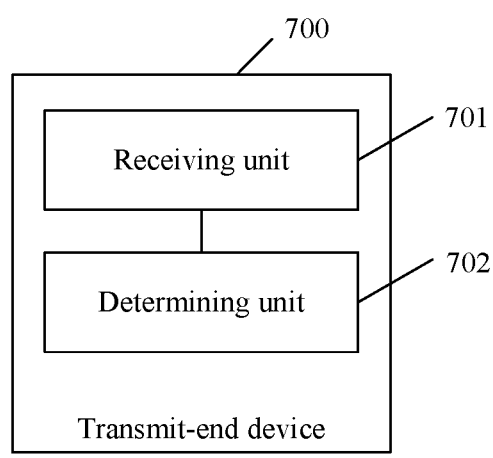
FIG. 7 is a schematic diagram of an example of a logical structure of a transmit-end device according to an embodiment of this application.

FIG. 7 is a schematic diagram of an example of a logical structure of a transmit-end device 700 according to an embodiment of this application. As shown in FIG. 7, the transmit-end device 700 includes a receiving unit 701 and a determining unit 702. The receiving unit 701 may be configured to perform S203 in FIG. 2 and/or perform another step described in this application. The determining unit 702 may be configured to perform S204 in FIG. 2 and/or perform another step described in this application.

The transmit-end device 700 is configured to execute the corresponding methods. Related technical content has been clearly described above, and therefore details are not described herein again.

Figure 8:
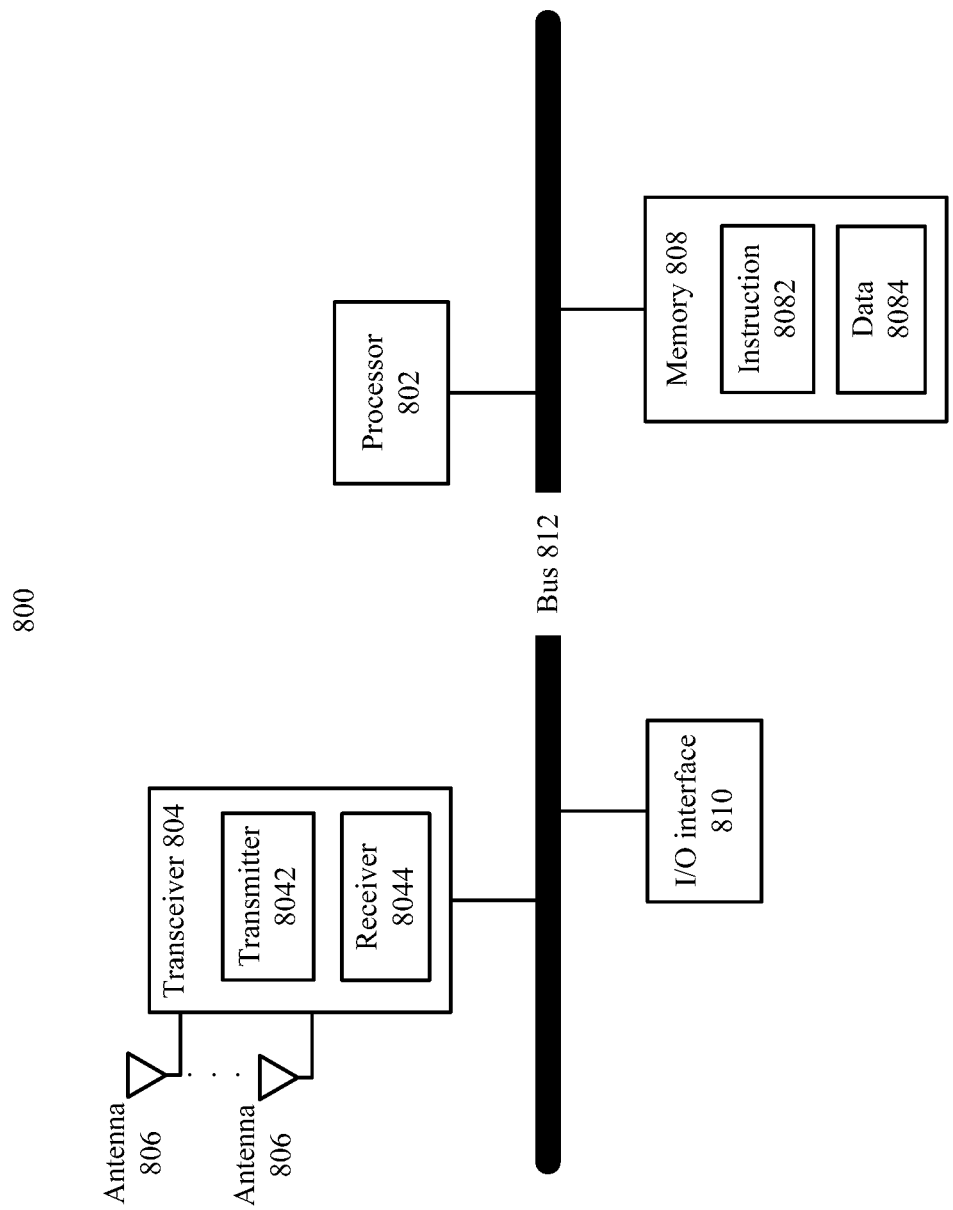
FIG. 8 is a schematic diagram of an example of a hardware structure of a communications device according to an embodiment of this application.

FIG. 8 is a schematic diagram of an example of a hardware structure of a communications device 800 according to an embodiment of this application. The communications device 800 may be the receive-end device described above, or may be the transmit-end device described above. As shown in FIG. 8, the communications device 800 includes a processor 802, a transceiver 804, a plurality of antennas 806, a memory 808, an I/O (input/output, Input/Output) interface 810, and a bus 812. The transceiver 804 further includes a transmitter 8042 and a receiver 8044, and the memory 808 is further configured to store an instruction 8082 and data 8084. In addition, the processor 802, the transceiver 804, the memory 808, and the I/O interface 810 are connected to and communicate with each other by using the bus 812, and the plurality of antennas 806 are connected to the transceiver 804.

The processor 802 may be a general purpose processor, for example, but not limited to, a central processing unit (CPU), or may be a dedicated processor, for example, but not limited to, a digital signal processor (DSP), an application-specific integrated circuit (ASIC), or a field programmable gate array (FPGA). In addition, the processor 802 may alternatively be a combination of a plurality of processors.

The transceiver 804 includes the transmitter 8042 and the receiver 8044. The transmitter 8042 is configured to send a signal by using at least one of the plurality of antennas 806. The receiver 8044 is configured to receive the signal by using the at least one of the plurality of antennas 806.

The memory 808 may be any type of storage medium such as a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, or a register. The memory 808 is specifically configured to store the instruction 8082 and the data 8084. The processor 802 may read and execute the instruction 8082 stored in the memory 808 to perform the foregoing steps and/or operations. The data 8084 may need to be used in a process of performing the foregoing steps and/or operations.

The I/O interface 810 is configured to: receive an instruction and/or data from a peripheral device, and output an instruction and/or data to the peripheral device.

In an embodiment of this application, the processor 802 may be configured to perform, for example, S201 in the method shown in FIG. 2. The processor 802 may be a processor specially designed to perform the foregoing steps and/or operations, or may be a processor that reads and executes the instruction 8082 stored in the memory 808 to perform the foregoing steps and/or operations. The data 8084 may need to be used when the processor 802 performs the foregoing steps and/or operations. The transmitter 8042 is specifically configured to perform, for example, S202 in the method shown in FIG. 2 by using the at least one of the plurality of antennas 806.

In another embodiment of this application, the processor 802 may be configured to perform, for example, S204 in the method shown in FIG. 2. The processor 802 may be a processor specially designed to perform the foregoing steps and/or operations, or may be a processor that reads and executes the instruction 8082 stored in the memory 808 to perform the foregoing steps and/or operations. The data 8084 may need to be used when the processor 802 performs the foregoing steps and/or operations. The receiver 8044 is specifically configured to perform, for example, S203 in the method shown in FIG. 2 by using the at least one of the plurality of antennas 806.

It should be noted that, in practice, the communications device 800 may further include other hardware components that are not listed one by one in this specification.

Persons of ordinary skill in the art may understand that all or some of the steps of the foregoing methods may be implemented by a program instructing relevant hardware. The program may be stored in a computer readable storage medium. The computer readable storage medium includes a ROM, a RAM, an optical disc, or the like.

An embodiment of this application further provides a storage medium. The storage medium may include a memory 808.

The information transmission apparatus provided in this embodiment of this application may be configured to execute the foregoing information transmission method. Therefore, for a technical effect that can be obtained by the information transmission apparatus, refer to the method embodiment, and details are not described in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to a computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. The fact that some measures are recorded in mutually different dependent claims does not indicate that a combination of these measures cannot bring better effects.

Although this application is described with reference to specific features and the embodiments thereof, obviously, various modifications and combinations may be made to them without departing from the spirit and scope of this application. Correspondingly, the specification and accompanying drawings are merely example description of this application defined by the claims, and are considered as any of or all modifications, variations, combinations or equivalents that cover the scope of this application. Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for communicating information that indicates a precoding vector in a multi-input multi-output (MIMO) communication system, comprising:
   receiving, by a terminal device, a reference signal from a base station;
   generating, by the terminal device, indication information that indicates eight component vectors of the precoding vector and a combination coefficient of each component vector, wherein:
   the eight component vectors comprise a first component vector that is a normalization reference component vector, the eight component vectors further comprise a second component vector, a third component vector, a fourth component vector, a fifth component vector, a sixth component vector, a seventh component vector and a eighth component vector that are non-normalization reference component vectors, 4 component vectors in the eight component vectors corresponds to a first polarization, and remaining 4 component vectors in the eight component vectors corresponds to a second polarization, the 4 component vectors corresponding to the first polarization are different from each other and the 4 component vectors corresponding to the second polarization are different from each other; for each component vector in the 4 component vectors corresponding to the first polarization, there is a same component vector in the 4 component vectors corresponding to the second polarization,
   the combination coefficient of the first component vector comprises a wideband amplitude coefficient whose quantization bit quantity is 0, a narrowband amplitude coefficient whose quantization bit quantity is 0, and a narrowband phase coefficient whose quantization bit quantity is 0,
   the combination coefficient of the second component vector comprises a wideband amplitude coefficient whose quantization bit quantity is 3, a narrowband amplitude coefficient whose quantization bit quantity is 1, and a narrowband phase coefficient whose quantization bit quantity is 3,
   the combination coefficient of the third component vector comprises a wideband amplitude coefficient whose quantization bit quantity is 3, a narrowband amplitude coefficient whose quantization bit quantity is 1, and a narrowband phase coefficient whose quantization bit quantity is 3,
   the combination coefficient of the fourth component vector comprises a wideband amplitude coefficient whose quantization bit quantity is 3, a narrowband amplitude coefficient whose quantization bit quantity is 1, and a narrowband phase coefficient whose quantization bit quantity is 3,
   the combination coefficient of the fifth component vector comprises a wideband amplitude coefficient whose quantization bit quantity is 3, a narrowband amplitude coefficient whose quantization bit quantity is 1, and a narrowband phase coefficient whose quantization bit quantity is 3,
   the combination coefficient of the sixth component vector comprises a wideband amplitude coefficient whose quantization bit quantity is 3, a narrowband amplitude coefficient whose quantization bit quantity is 1, and a narrowband phase coefficient whose quantization bit quantity is 3,
   the combination coefficient of the seventh component vector comprises a wideband amplitude coefficient whose quantization bit quantity is 3, a narrowband amplitude coefficient whose quantization bit quantity is 0, and a narrowband phase coefficient whose quantization bit quantity is 2;
   the combination coefficient of the eighth component vector comprises a wideband amplitude coefficient whose quantization bit quantity is 3, a narrowband amplitude coefficient whose quantization bit quantity is 0, and a narrowband phase coefficient whose quantization bit quantity is 2; and
   sending, by the terminal device, the indication information to the base station.

2. The method according to claim 1, wherein the combination coefficient of the first component vector is a preset constant.

3. The method according to claim 1, wherein the wideband amplitude coefficient of the combination coefficient of the first component vector is 1.

4. The method according to claim 1, wherein the indication information is comprised in a precoding matrix indicator (PMI).

5. The method according to claim 1, wherein the terminal device sends the indication information to the base station through multiple messages.

6. A processing circuit, comprising:
   a processor; and
   a memory having computer readable instructions stored thereon which, when executed by the processor, cause the processor to generate and send indication information that indicates eight component vectors of a precoding vector and a combination coefficient of each component vector, wherein:
   the eight component vectors comprise a first component vector that is a normalization reference component vector, the eight component vectors further comprise a second component vector, a third component vector, a fourth component vector, a fifth component vector, a sixth component vector, a seventh component vector and a eighth component vector that are non-normalization reference component vectors, 4 component vectors in the eight component vectors corresponds to a first polarization, and remaining 4 component vectors in the eight component vectors corresponds to a second polarization, the 4 component vectors corresponding to the first polarization are different from each other and the 4 component vectors corresponding to the second polarization are different from each other; for each component vector in the 4 component vectors corresponding to the first polarization, there is a same component vector in the 4 component vectors corresponding to the second polarization, the combination coefficient of the first component vector comprises a wideband amplitude coefficient whose quantization bit quantity is 0, a narrowband amplitude coefficient whose quantization bit quantity is 0, and a narrowband phase coefficient whose quantization bit quantity is 0;

the combination coefficient of the second component vector comprises a wideband amplitude coefficient whose quantization bit quantity is 3, a narrowband amplitude coefficient whose quantization bit quantity is 1, and a narrowband phase coefficient whose quantization bit quantity is 3;

the combination coefficient of the third component vector comprises a wideband amplitude coefficient whose quantization bit quantity is 3, a narrowband amplitude coefficient whose quantization bit quantity is 1, and a narrowband phase coefficient whose quantization bit quantity is 3;

the combination coefficient of the fourth component vector comprises a wideband amplitude coefficient whose quantization bit quantity is 3, a narrowband amplitude coefficient whose quantization bit quantity is 1, and a narrowband phase coefficient whose quantization bit quantity is 3;

the combination coefficient of the fifth component vector comprises a wideband amplitude coefficient whose quantization bit quantity is 3, a narrowband amplitude coefficient whose quantization bit quantity is 1, and a narrowband phase coefficient whose quantization bit quantity is 3; and the combination coefficient of the sixth component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the seventh component vector comprises a wideband amplitude coefficient whose quantization bit quantity is 3, a narrowband amplitude coefficient whose quantization bit quantity is 0, and a narrowband phase coefficient whose quantization bit quantity is 2;

the combination coefficient of the eighth component vector comprises a wideband amplitude coefficient whose quantization bit quantity is 3, a narrowband amplitude coefficient whose quantization bit quantity is 0, and a narrowband phase coefficient whose quantization bit quantity is 2.

7. The processing circuit according to claim 6, wherein the combination coefficient of the first component vector is a preset constant.

8. The processing circuit according to claim 6, wherein the wideband amplitude coefficient of the combination coefficient of the first component vector is 1.

9. The processing circuit according to claim 6, wherein the indication information is comprised in a precoding matrix indicator (PMI).

10. A terminal device, comprising:
a receiver, configured to receive a reference signal from a base station;
a processor, configured to generate indication information that indicates eight component vectors of a precoding vector and a combination coefficient of each component vector, wherein:
the eight component vectors comprise a first component vector that is a normalization reference component vector, the eight component vectors further comprise a second component vector, a third component vector, a fourth component vector, a fifth component vector, a sixth component vector, a seventh component vector and a eighth component vector that are non-normalization reference component vectors, 4 component vectors in the eight component vectors corresponds to a first polarization, and remaining 4 component vectors in the eight component vectors corresponds to a second polarization, the 4 component vectors corresponding to the first polarization are different from each other and the 4 component vectors corresponding to the second polarization are different from each other; for each component vector in the 4 component vectors corresponding to the first polarization, there is a same component vector in the 4 component vectors corresponding to the second polarization, the combination coefficient of the first component vector comprises a wideband amplitude coefficient whose quantization bit quantity is 0, a narrowband amplitude coefficient whose quantization bit quantity is 0, and a narrowband phase coefficient whose quantization bit quantity is 0, the combination coefficient of the second component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the third component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the fourth component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the fifth component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the sixth component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the seventh component vector comprises a wideband amplitude coefficient whose quantization bit quantity is 3, a narrowband amplitude coefficient whose quantization bit quantity is 0, and a narrowband phase coefficient whose quantization bit quantity is 2;

the combination coefficient of the eighth component vector comprises a wideband amplitude coefficient whose quantization bit quantity is 3, a narrowband amplitude coefficient whose quantization bit quantity is 0, and a narrowband phase coefficient whose quantization bit quantity is 2; and a transmitter, configured to send the indication information to the base station.

11. The terminal device according to claim 10, wherein the combination coefficient of the first component vector is a preset constant.

12. The terminal device according to claim 10, wherein the wideband amplitude coefficient of the combination coefficient of the first component vector is 1.

13. The terminal device according to claim 10, wherein the indication information is comprised in a precoding matrix indicator (PMI).

14. The terminal device according to claim 10, wherein the transmitter is configured to send the indication information to the base station through multiple messages.

15. A non-transitory computer readable storage medium, configured to store a computer program instruction which, when executed by a processor, cause the processor to perform operations comprising:

generating indication information that indicates eight component vectors of a precoding vector and a combination coefficient of each component vector, wherein:

the eight component vectors comprise a first component vector that is a normalization reference component vector, the eight component vectors further comprise a second component vector, a third component vector, a fourth component vector, a fifth component vector, a sixth component vector, a seventh component vector and a eighth component vector that are non-normalization reference component vectors, 4 component vectors in the eight component vectors corresponds to a first polarization, and remaining 4 component vectors in the eight component vectors corresponds to a second polarization, the 4 component vectors corresponding to the first polarization are different from each other and the 4 component vectors corresponding to the second polarization are different from each other; for each component vector in the 4 component vectors corresponding to the first polarization, there is a same component vector in the 4 component vectors corresponding to the second polarization, the combination coefficient of the first component vector comprises a wideband amplitude coefficient whose quantization bit quantity is 0, a narrowband amplitude coefficient whose quantization bit quantity is 0, and a narrowband phase coefficient whose quantization bit quantity is 0, the combination coefficient of the second component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the third component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the fourth component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the fifth component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the sixth component vector comprises a wideband amplitude coefficient whose quantization bit quantity is 3, a narrowband amplitude coefficient whose quantization bit quantity is 1, and a narrowband phase coefficient whose quantization bit quantity is 3, the combination coefficient of the seventh component vector comprises a wideband amplitude coefficient whose quantization bit quantity is 3, a narrowband amplitude coefficient whose quantization bit quantity is 0, and a narrowband phase coefficient whose quantization bit quantity is 2;

the combination coefficient of the eighth component vector comprises a wideband amplitude coefficient whose quantization bit quantity is 3, a narrowband amplitude coefficient whose quantization bit quantity is 0, and a narrowband phase coefficient whose quantization bit quantity is 2; and sending the indication information to a base station.

16. The medium according to claim 15, wherein the combination coefficient of the first component vector is a preset constant.

17. The medium according to claim 15, wherein the wideband amplitude coefficient of the combination coefficient of the first component vector is 1.

18. The medium according to claim 15, wherein the indication information is comprised in a precoding matrix indicator (PMI).

19. The medium according to claim 15, wherein the indication information is sent to the base station through multiple messages.

* * * * *